US008831273B2

(12) United States Patent
Karafin et al.

(10) Patent No.: US 8,831,273 B2
(45) Date of Patent: Sep. 9, 2014

(54) METHODS AND SYSTEMS FOR PRE-PROCESSING TWO-DIMENSIONAL IMAGE FILES TO BE CONVERTED TO THREE-DIMENSIONAL IMAGE FILES

(75) Inventors: Jonathan Karafin, Village, CA (US); Matthew Dejohn, Chatsworth, CA (US); Alex Torres, Port Saint Lucie, FL (US)

(73) Assignee: RealD Inc., Beverly Hills, CA (US)

( * ) Notice: Subject to any disclaimer, the term of this patent is extended or adjusted under 35 U.S.C. 154(b) by 469 days.

(21) Appl. No.: 13/230,750

(22) Filed: Sep. 12, 2011

(65) Prior Publication Data
US 2012/0106785 A1  May 3, 2012

Related U.S. Application Data

(60) Provisional application No. 61/381,894, filed on Sep. 10, 2010.

(51) Int. Cl.
*G06K 9/00* (2006.01)
*G06T 11/00* (2006.01)

(52) U.S. Cl.
CPC ..................... *G06T 11/00* (2013.01)
USPC ........................................ 382/100

(58) Field of Classification Search
CPC ......... G06T 5/005; G06T 11/00; G06T 17/00; G06T 2200/04; H04N 13/0022; H04N 13/0495
USPC ........... 382/100, 154, 173; 345/421, 606, 632
See application file for complete search history.

(56) References Cited

U.S. PATENT DOCUMENTS

| 6,208,348 | B1 | 3/2001 | Kaye | 345/419 |
|---|---|---|---|---|
| 6,215,516 | B1 | 4/2001 | Ma et al. | 348/43 |
| 6,456,340 | B1 | 9/2002 | Margulis | 348/745 |
| 6,492,986 | B1 | 12/2002 | Metaxas et al. | 345/420 |
| 6,496,598 | B1 | 12/2002 | Harman | 382/154 |
| 6,515,659 | B1 | 2/2003 | Kaye et al. | 345/419 |
| 6,515,662 | B1 | 2/2003 | Garland | 345/427 |
| 6,535,233 | B1 | 3/2003 | Smith | 345/856 |
| 6,590,573 | B1 | 7/2003 | Geshwind | 345/419 |
| 6,650,339 | B1 | 11/2003 | Silva et al. | 345/619 |
| 6,677,944 | B1 | 1/2004 | Yamamoto | 345/422 |
| 6,686,926 | B1 | 2/2004 | Kaye | 345/680 |
| 6,765,568 | B2 | 7/2004 | Swift et al. | 345/419 |
| 6,791,542 | B2 | 9/2004 | Matusik et al. | 345/420 |
| 6,798,406 | B1 | 9/2004 | Jones et al. | 345/419 |
| 7,102,633 | B2 | 9/2006 | Kaye et al. | 345/419 |
| 7,116,323 | B2 | 10/2006 | Kaye et al. | 345/419 |
| 7,116,324 | B2 | 10/2006 | Kaye et al. | 345/419 |
| 2002/0048395 | A1 | 4/2002 | Harman et al. | 382/154 |
| 2002/0063780 | A1 | 5/2002 | Harman et al. | 348/211 |
| 2002/0075384 | A1 | 6/2002 | Harman | 348/43 |
| 2004/0004616 | A1 | 1/2004 | Konya et al. | 345/419 |

FOREIGN PATENT DOCUMENTS

| EP | 1187494 A2 | 3/2002 | H04N 13/00 |
|---|---|---|---|
| WO | WO 97/24000 A1 | 7/1997 | H04N 13/00 |
| WO | WO 99/12127 A1 | 3/1999 | G06T 15/00 |
| WO | WO 99/30280 A1 | 6/1999 | G06T 7/40 |
| WO | WO 00/79781 A1 | 12/2000 | H04N 3/00 |
| WO | WO 01/01348 A1 | 1/2001 | G06T 7/40 |
| WO | WO 02/13143 A1 | 2/2002 | G06T 15/00 |

OTHER PUBLICATIONS

Allchin, James Edward, "An Architecture for Reliable Decentralized Systems," Ph.D. Thesis, Georgia Institute of Technology, 185 pages, Sep. 1983.
Augun Audrey, "Integrating Lotus Notes With Enterprise Data," Lotus Notes Advisory, pp. 22-25, Jul.-Aug. 1996.
Brinkmann, Ron, "The Art and Science of Digital Compositing," Second Edition, Elsevier Inc., Burlington, MA, 2008, pp. 1-14, 39-51, 93-231, 428-435, 605-625.
Finance, Charles et al., "The Visual Effects Producer Understanding the Art and Business of VFX," Elsevier Inc., Amsterdam: Boston, 2010, pp. 21-23, 37-52, 215-225, 241-248.
Gao, Qigang et al., Perceptual Motion Tracking from Image Sequences, IEEE, Jan. 2001, pp. 389-392.
Gleicher, Michael, "Image Snapping," SIGGRAPH: pp. 183-190, Jun. 1995.
Grossman, John, "Look Ma, No Glasses", Games, Apr. 1992, pp. 12-14.
Hanrahan, Pat et al., "Direct WYSIWYG painting and texturing on 3D shapes", Computer Graphics, vol. 24 Issues 4, pp. 215-223. Aug. 1990.
Izquierdo, Ebroul et al., Virtual 3D-View Generation from Stereoscopic Video Data, IEEE, Jan. 1998, pp. 1219-1224.
Kaufman, Debra, 3D Movie Magic Web Page Information, Jan. 21, 1998 The Big Picture, Web Page for Xenotech, Apr. 1998.
Kaufman, Debra, The Big Picture, Web Page for Xenotech, Apr. 1998, pp. 1-4 (downloaded Sep. 8, 1998).
Lipton, Lenny, "Foundation of The Stereoscopic Cinema A Study In Depth," Van Nostrand Reinhold Company Inc., New York, NY, 1982, pp. 53-90, 177-220.
Mae, Yasushi, et al., "Object Tracking in Cluttered Background Based on Optical Flow and Edges," Proc. 13th Int. Conf. on Pattern Recognition. vol. 1, pp. 196-200, Apr. 1996.
Mendiburu, Bernard, "3D Movie Making: Stereoscopic Digital Cinema From Script To Screen," Elsevier Inc., Burlington, MA, 2009, pp. 1-33, 47-71, 123-149, 171-196.
Mortensen, E.N. et al., "Intelligent Scissors for Image Composition," Computer Graphics (SIGGRAPH '95), pp. 191-198, Los Angeles, CA, Aug. 1995.
Mortensen, E.N. et al., "Interactive segmentation with Intelligent Scissors," Graphical Models and Image Processing, vol. 60 No. 5, pp. 349-384, Sep. 2002.

(Continued)

*Primary Examiner* — Andrew W Johns
(74) *Attorney, Agent, or Firm* — Neil G. Mothew; Darlene K. Kondo

(57) ABSTRACT

Disclosed herein are methods and systems of efficiently, effectively, and accurately preparing images for a 2D to 3D conversion process by pre-treating occlusions and transparencies in original 2D images. A single 2D image, or a sequence of images, is ingested, segmented into discrete elements, and the discrete elements are individually reconstructed. The reconstructed elements are then re-composited and ingested into a 2D to 3D conversion process.

50 Claims, 11 Drawing Sheets

(56) References Cited

OTHER PUBLICATIONS

Murray et al., Active Tracking, IEEE International Conference on Intelligent Robots and Systems, Sep. 1993, pp. 1021-1028.

Nguyen, Hieu Tat et al., Tracking Nonparameterized Object Contours in Video, IEEE Transactions on Image Processing, vol. 11, No. 9, Sep. 2002, pp. 1081-1091.

Noll, Michael A., Computer-Generated Three-Dimensional Movies, Computers and Automation, vol. 14, No. 11 (Nov. 1965), pp. 20-23.

Noll, Michael A., Stereographic Projections by Digital Computer, Computers and Automation, vol. 14, No. 5 (May 1965), pp. 32-34.

Ohm et al., An Object-Based System for Stereoscopic Viewpoint Synthesis, IEEE transaction on Circuits and Systems for Video Technology, vol. 7, No. 5, Oct. 1997, pp. 801-811.

Okun, Jeffrey A., Susan Zwerman, eds., "The VES Handbook of Visual Effects: Industry Standard VFX Practices and Procedures," Elsevier Inc., Burlington, MA. 2010, pp. 1-14, 74-75, 222-232, 414-434, 550-574, 694-697.

Selsis et al., Automatic Tracking and 3D Localization of Moving Objects by Active Contour Models, Intelligent Vehicles 95 Symposium, Sep. 1995, pp. 96-100.

Slinker et al., "The Generation and Animation of Random Dot and Random Line Autostereograms". Journal of Imaging Science and Technology, vol. 36, No. 3, pp. 260-267, May 1992.

Weber, Joseph et al., "Rigid Body Segmentation and Shape Description from Dense Optical Flow Under Weak Perspective," IEEE Transactions on Pattern Analysis and Machine Intelligence, vol. 19, No. 2, Feb. 1997, pp. 139-143.

Wright, Steve, "Digital Compositing for Film and Video," Third Edition, Elsevier Inc., Burlington, MA, 2010, pp. 1-3, 103-110, 125-131, 153-156, 168-171.

Zhong, Di et al., "AMOS: An Active System for MPEG-4 Video Object Segmentation," ICIP (2) 8: pp. 647-651, Apr. 1998.

Co-pending U.S. Appl. No. 13/230,733, filed Sep. 12, 2011.

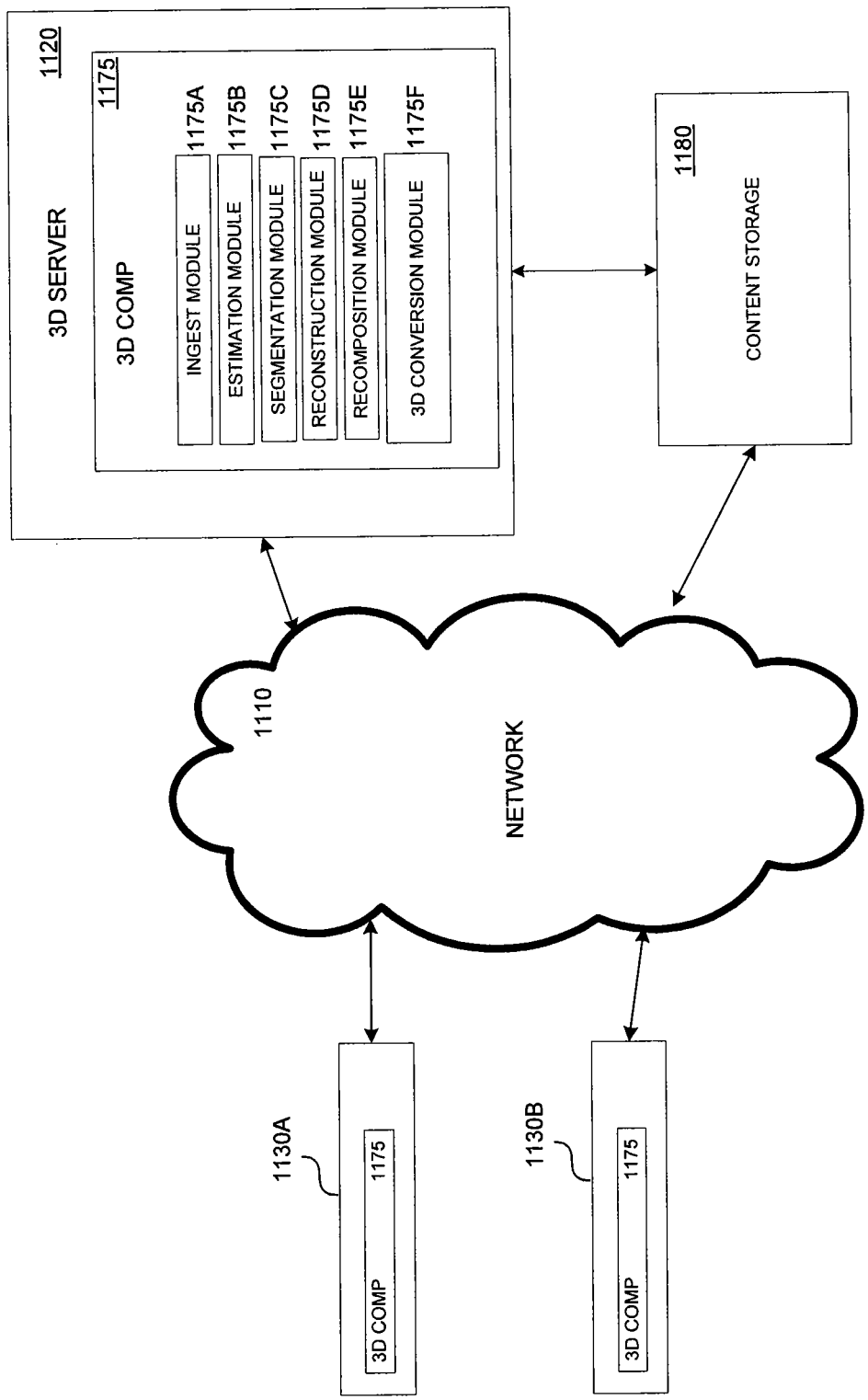

METHODS AND SYSTEMS FOR PRE-PROCESSING TWO-DIMENSIONAL IMAGE FILES TO BE CONVERTED TO THREE-DIMENSIONAL IMAGE FILES

PRIORITY CLAIM

Priority is claimed to U.S. Provisional Application Ser. No. 61/381,894 filed on Sep. 10, 2010, titled "Method of Preparing Two-Dimensional Files to be Converted to Three-Dimensional Files", by inventors Jonathan Karafin, Matt DeJohn, and Alex Tones, the contents of which are expressly incorporated herein by this reference.

CROSS-REFERENCE TO RELATED REFERENCES

The present application is related to the following issued patents, each of which is incorporated herein in its entirety by this reference:

- U.S. Pat. No. 7,116,324, titled "Method for Minimizing Visual Artifacts Converting Two-Dimensional Motion Pictures into Three-Dimensional Motion Pictures," issued on Oct. 3, 2006.
- U.S. Pat. No. 7,116,323, titled "Method of Hidden Surface Reconstruction for Creating Accurate Three-Dimensional Images Converted from Two-Dimensional Images," issued on Oct. 3, 2006.
- U.S. Pat. No. 7,102,633, titled "Method for Conforming Objects to Common Depth Perspective for Converting Two-Dimensional Images into Three-Dimensional Images," issued on Sep. 5, 2006.
- U.S. Pat. No. 6,686,926, titled "Image Processing System and Method for Converting Two-Dimensional Images into Three-Dimensional Images," issued on Feb. 3, 2004.
- U.S. Pat. No. 6,515,659, titled "Method and System for Creating Realistic Smooth Three-Dimensional Depth Contours from Two-Dimensional Images," issued on Feb. 4, 2003.
- U.S. Pat. No. 6,208,348, titled "System and Method for Dimensionalization Processing of Images in Consideration of a Predetermined Image Projection Format," issued on Mar. 27, 2001.

Additionally, the present application is related to co-pending and commonly assigned U.S. patent application Ser. No. 13/230,733, entitled "Systems and Methods for Converting Two-Dimensional Images to Three Dimensional Images," filed concurrently, which is also incorporated herein in its entirety by this reference.

FIELD

The techniques discussed herein generally relate to methods and systems for pre-processing Two-Dimensional ("2D") images that are used for generation of corresponding Three-Dimensional ("3D") images. More specifically, the techniques relate to methods and systems of processing 2D images to avoid subsequent occlusions and transparencies that may arise during 3D conversion of the 2D images.

BACKGROUND

Converting monoscopic, or 2D, image sequences to stereoscopic, or 3D, sequences may be accomplished through any one of the numerous existing processes. One of the most common conversion processes requires that discrete elements of an image be segmented so that the discrete elements can then be individually modified during the conversion process. During the conversion process, these individual discrete elements are offset horizontally and re-composited into a new position. The new position is determined by referencing the inherent monoscopic depth cues within the image sequence itself, by artistic design, or a combination of both methodologies. The segmentation, modification, and compositing steps create an alternate viewing perspective of the original image sequence.

The creation of an alternate view may be performed once, in which case the observer views the original 2D image with one eye, and the second modified alternate view with the other eye. Or, the creation of an alternate view can be carried out twice, with the horizontal modifications and offsets being carried out in opposite directions between the two alternate views. In this latter case, two entirely new viewing perspectives are created, and the observer views one of them with one eye and the other with the second eye.

The above illustrated process of generating the new and alternative view(s) from a single original monoscopic image sequence reveals newly viewable areas within the alternate view(s), which were formerly occluded by the discrete elements. Left as is, these formerly occluded areas are distracting to the viewer and need to be replaced with image data that is appropriate for that image. What replaces these formerly occluded portions of the new alternate image varies depending on the process and/or what is logically behind the discrete element that was blocking the formerly occluded portion. Examples of what may replace the formerly occluded area include a solid color, replication of context image data, or an output of a selected algorithm.

Current 2D to 3D conversion processes have to deal with the problem of previously occluded and newly viewable regions. As such, prior conversion processes have not only attempted to establish an effective conversion process, but also methods of treating these revealed, formerly occluded surfaces after the 3D (i.e., "alternate view") images are created. Several of these methods are discussed herein below.

One such method of dealing with revealed surfaces is automatic "inpainting" the formerly occluded area to replace the missing data. However, inpainting is computationally expensive and typically the results are inaccurate and requires additional input from a sentient operator. Another method is manually adjusting image data after the conversion process. Unfortunately, manually adjusting image data after the conversion process can be equally time consuming and expensive, as it requires repetitious practice to prevent inaccuracies. In both cases, replacement image data must match the image data within the newly created image sequence and also complement the alternate perspective view, whether the alternate view was also generated in the conversion process or is the original monoscopic image sequence.

Thus, there remains a long felt need in the art for methods and systems of efficiently and effectively treating occlusions and transparencies resulting from 2D to 3D conversion processes.

SUMMARY

To minimize the limitations in the prior art, and to minimize other limitations that will become apparent upon reading and understanding the present specification, the present application describes methods and systems of efficiently and effectively preparing images to be converted from 2D to 3D and specifically, treating occlusions and transparencies in the images.

In at least one embodiment, the techniques presented herein include a process that includes the steps of segmenting the discrete parts of a single or plurality of monoscopic image sequences, and replacing the estimated occluded areas before the images are converted from monoscopic 2D to stereoscopic 3D.

In embodiments, the discrete monoscopic element sequences are then ingested individually into the 2D to 3D conversion process. The monoscopic element sequences are then re-composited to approximate the original monoscopic image sequence. This process occludes much of image data in the processed layers, but the inherent layers remain completely intact and controllable within the composite. These layered elements can then be processed with horizontal offsets and modifications during the 2D to 3D conversion process. The new view(s) will reveal previously processed image data, thus preventing the need to fill any occlusions subsequent to or during the 2D-3D conversion process.

The approach of the techniques presented here are vastly superior to the alternative approach of reconstructing newly revealed occlusions and inherent transparencies only in the complementary or new perspective (i.e., after the 3D alternate view images are generated), due to the complexity and precision needed to perform the task after the 2D to 3D conversion process has been completed. These techniques alleviate most of the complexity and precision by removing the stereoscopic conformity that must be upheld when trying to reconstruct or obscure the revealed occlusions of the newly created complementary or new perspective after the 2D to 3D conversion process.

In at least one embodiment, the technique discussed herein commences in the same manner as a conventional 2D to 3D process: with the segmentation of discrete elements in the monoscopic image sequence. This task is performed, for example, after the monoscopic image sequence has been digitally encoded and ingested into a computer. The segmentation is digitally performed multiple ways, using a variety of visual effects techniques and software. Techniques may include, but are not limited to, rotoscoping, procedural color keys, edge detection, and/or motion vector estimation. These discrete elements have different perceived depth planes within the scene. Different depth planes are ascertained by the analysis of monoscopic visual depth cues that dictate the relative depths of elements. Some monoscopic depth may be determined using cues including, but not limited to, atmospheric contrast, relative size, occlusion, and perceived speed over distance traveled. The discrete depth elements are segmented throughout the entire monoscopic sequence. At this point, the discrete elements may be offset and modified horizontally in order to estimate the amount of occluded area that will be revealed during the conversion process.

With the segmentation and offset estimation completed, the discrete element sequences have the estimated monoscopic occluded image areas reconstructed. This can be accomplished in various ways using a wide variety of visual effects techniques and software. Techniques for monoscopic image reconstruction may include, but are not limited to, digital matte painting, camera tracking and matchmoving, artificial particle creation, procedural digital painting techniques, computer generated replacement objects, motion estimated automatic monoscopic paint filling, artificial grain, and/or digital noise creation.

After the completion of the discrete monoscopic element sequence reconstruction process, in embodiments, sequences may be re-composited to approximate the original monoscopic image sequence, before it was segmented into element sequences that were reconstructed. The re-composite process can be carried out through various digital compositing operations. Operations may include, but are not limited to, Over, Add, Screen, Mix, Multiply, Divide, etc. These operations may be carried out in 2D compositing space, where positioning in only the X and Y axis is possible, in 2.5D compositing space, where limited Z-axis positioning is possible in addition to X and Y axis positioning, or in 3D compositing space, where complete positioning in all three axis is available.

At the end of the segmentation of the original monoscopic image sequence into individual discrete element sequences, or after the reconstruction of the discrete monoscopic element sequences, the option exists to pre-compose the individual monoscopic element sequences as encoded RGB, RGBA, or RGB and Alpha image file sequences. The encoded files may be, but are not limited to, Jpeg, Tiff, Cineon, DPX, PNG, openEXR, bitmap, Targa, Photoshop Document, and/or container files such as mpeg, QuickTime, mp4, and/or Matroska.

Depending on techniques or software being used, in embodiments, the eventual 2D to 3D conversion process may be carried out on the original monoscopic image sequence in parallel with the individual monoscopic element sequence reconstruction and re-composite. Furthermore, in embodiments, the re-composite may be combined with the 2D to 3D conversion process before finalization. In embodiments where the individual monoscopic element sequence reconstruction 2D to 3D process is not being done in parallel with the 2D to 3D conversion process, the re-composite may be ingested into that process to be completed.

When the re-composited discrete elements are ingested into the 2D to 3D conversion process, the formerly occluded areas revealed by this process that would normally reveal zero image data or some intermediary or simple interpolation image data now reveal the reconstructed image data that was completed previously in the individual monoscopic element reconstruction process. This correct and revealed image data also conforms to the horizontal offsets and modifications performed in the 2D to 3D conversion process.

These techniques, when used in conjunction with the 2D to 3D conversion process, enable an efficient and stereoscopically correct conversion that results in substantial improvement over prior art processes. While it is possible to correct the formerly occluded surfaces of a converted monoscopic image sequence after the 3D conversion is complete (as is the case with prior art approaches), such a process is ineffective, time-consuming, and/or computationally expensive. The techniques discussed in the present application enable the reconstruction work to be performed at a monoscopic stage rather than increasing the complexity and precision at a stereoscopic stage.

Additionally, the techniques discussed herein allow for greater control when converting monoscopic image sequences that exhibit semi-transparent elements. These elements may include, but are not limited to, smoke, reflections, motion blur, defocused elements, haze, volumetric lighting, water splashes or droplets, ethereal elements, and/or holograms. By preparing all the discrete elements before the conversion, there is great flexibility in setting the 3D depth, including the ability to scale the overall depth for different venues with varying screen sizes.

Exemplary Embodiments

One exemplary embodiment is a method of preparing a two-dimensional image to be converted into a three-dimensional image, comprising the steps: providing an original sequence of two-dimensional digital images; segmenting one or more discrete elements within the single two-dimensional digital image; wherein the one or more discrete elements have one or more occluded regions; reconstructing the one or more occluded regions of the one or more discrete elements. The method may also include ingesting one or more reconstructed discrete elements into a two-dimensional to three dimensional conversion process and initiating a two-dimensional to three dimensional conversion process. The one or more reconstructed discrete elements preferably include a contextually correct revealed-image data. The plurality of revealed image data is used during the two-dimensional to three dimensional conversion process to create one or more alternate perspective images and the plurality of revealed image data allows the two-dimensional to three dimensional conversion process to be accomplished more efficiently.

The method further comprises the steps of: re-composting the one or more reconstructed discrete elements and ingesting them into the two-dimensional to three dimensional conversion process. The one or more reconstructed discrete elements are re-composited in a monoscopic state that approximates the single two-dimensional digital image before segmentation.

The method preferably includes the steps of: estimating one or more occluded regions by pre-visualizing a two-dimensional to three dimensional conversion of the single two-dimensional digital image and offsetting the one or more discrete elements accordingly; wherein the one or more occluded regions of the one or more discrete elements is reconstructed based on the pre-visualization estimation. The occluded regions of the one or more discrete elements may be fully or partially reconstructed. The method may also include the steps of pre-composing the one or more reconstructed discrete elements as encoded RGB, RGBA, or RGB and A image files before ingestion of the one or more reconstructed discrete elements into the two-dimensional to three dimensional conversion process.

Alternatively, this embodiment may include the steps of: estimating one or more occluded regions by pre-visualizing the two-dimensional to three dimensional conversion process of the single two-dimensional digital image and offsetting the one or more discrete elements accordingly; wherein the one or more occluded regions of the one or more discrete elements is reconstructed based on pre-visualization estimation; pre-composing the one or more discrete elements as encoded RGB, RGBA, or RGB and Alpha image files before ingestion of the one or more discrete elements into the two-dimensional to three dimensional conversion process. The one or more discrete elements may be fully or partially reconstructed.

Another exemplary embodiment is a method of preparing a two-dimensional image sequence to be converted into a three-dimensional image sequence, comprising the steps: providing an original sequence of two-dimensional digital images; wherein the original sequence of two-dimensional digital images is made up of a plurality of two-dimensional digital images; segmenting one or more discrete elements within the original sequence of two-dimensional digital images; wherein the one or more discrete elements have one or more occluded regions; reconstructing the one or more occluded regions of the one or more discrete elements. This embodiment is directed to performing the preparation method on an entire series or sequence of images. The method preferably includes: ingesting the one or more reconstructed discrete elements into a two-dimensional to three dimensional conversion process and then initiating a two-dimensional to three dimensional conversion process; wherein the one or more reconstructed discrete elements include a plurality of revealed image data; wherein the plurality of revealed image data is used during the two-dimensional to three dimensional conversion process to create one or more alternate perspective image sequences; and wherein the plurality of revealed image data allows the two-dimensional to three dimensional conversion process to be accomplished more efficiently. The sequence related method may also include the steps of: re-composting the one or more reconstructed discrete elements; ingesting the one or more reconstructed and re-composted discrete elements into the two-dimensional to three dimensional conversion process; wherein the one or more reconstructed discrete elements are re-composited in a monoscopic state that approximates the original sequence of two-dimensional digital images before segmentation; estimating one or more occluded regions by pre-visualizing a two-dimensional to three dimensional conversion of the original sequence of two-dimensional digital images and offsetting the one or more discrete elements accordingly; wherein the one or more occluded regions of the one or more discrete elements is reconstructed based on the pre-visualization estimation. The discrete elements may be fully or partially reconstructed.

The method of preparing a two-dimensional image sequence to be converted into a three-dimensional image sequence may also include pre-composing the one or more reconstructed discrete elements as encoded RGB, RGBA, or RGB and Alpha (in this case the alpha channel is represented by a separate image file sequence) before ingestion of the one or more reconstructed discrete elements into the two-dimensional to three dimensional conversion process.

Alternatively or conjointly, the method of preparing a two-dimensional image sequence to be converted into a three-dimensional image sequence may also include the steps of: estimating one or more occluded regions by pre-visualizing a partial or full monoscopic to stereoscopic conversion of the original sequence of two-dimensional digital images and offsetting the one or more discrete elements accordingly; wherein the one or more occluded regions of the one or more discrete elements is reconstructed based on pre-visualization estimation; pre-composing the one or more discrete elements as encoded RGB, RGBA, or RGB and Alpha image files before ingestion of the one or more discrete elements into the two-dimensional to three dimensional conversion process. The occluded regions can be fully or partially reconstructed.

For either or both of the above two embodiments, the alternate perspective images created during the two-dimensional to three dimensional conversion process may be the result of a process selected from the group including, but not limited to: two-dimensional image modifications driven by three-dimensional geometry manipulation systems; two-dimensional image modifications driven by two-dimensional depth map systems; two-dimensional image modifications driven by color or luminance systems; two-dimensional image modifications driven by two-dimensional warping and filtering systems; two-dimensional image manipulations driven by motion vector estimation systems; two-dimensional image manipulations driven by temporal estimation systems; three-dimensional modeling and texturing based off of camera tracking or solving systems; three-dimensional modeling and texturing systems; three-dimensional modeling and displacement systems; or three-dimensional modeling and projection systems.

For either or both of the above two embodiments, the one or more alternate perspective images may include one or more revealed regions that were occluded in the single two-dimensional digital image.

For either or both of the above two embodiments, the two-dimensional to three dimensional conversion process may include determining one or more depths (implied or exact) of the single two-dimensional digital image; wherein the single two-dimensional digital image is recorded by an original monoscopic camera that includes a depth system selected from the group including, but not limited to: an additional camera that is mounted to the original monoscopic camera, which is oriented toward a same subject as the original monoscopic camera; one or more beam splitter camera rigs; the additional camera being placed in proximity to the original monoscopic camera to capture one or more additional perspectives; a lidar scanning system; a motion capture system; a computerized motion control camera system; or a multicamera timed camera system.

For either or both of the above two embodiments, the two-dimensional to three dimensional conversion process includes determining one or more depths (implied or exact) of the single two-dimensional digital image; wherein the one or more depths are determined through an analysis of one or more depth cues; wherein the one or more depth cues are selected from the group including, but not limited to: an atmospheric contrast; a volumetric light; a relative size of one or more objects in relation to a standard size of the one more objects; the relative size of the one or more objects in relation to the one or more objects proximity to a horizon; one or more foreground objects occluding one or more background objects; a relative speed of one or more moving objects over an equal distance; or a color, a shadow, and a lighting of the one or more objects.

For either or both of the above two embodiments, the segmentation of one or more discrete elements may be accomplished by a method selected from the group including, but not limited to: rotoscoping the single two-dimensional digital image manually through an operator (or artist); rotoscoping the single two-dimensional digital image partially manually and partially automatically; procedural color keying luminance keying; procedural color keying color difference keying; selective image isolation through motion vector analysis; selective image isolation through planar tracking; or selective image isolation through camera solving.

For either or both of the above two embodiments, the method may include the steps of: inserting a plurality of temporary image data into the one or more reconstructed occluded regions; wherein the plurality of data is in context of a scene within the original sequence of two-dimensional digital images; wherein the plurality of temporary image data is selected from the group including, but not limited to: a solid color; a repeated pattern of image data; a repeated pattern of a plurality of colors; a replication of an image data formerly occluding the one or more occluded regions; an inverted version of the image data formerly occluding the one or more occluded regions; and blank (or zero image) data.

For either or both of the above two embodiments, the re-compositing of the one or more reconstructed discrete elements may be accomplished using a method selected from the group including, but not limited to: Over; Add; Multiply; Divide; etc. Over is when one element is placed over another element. Add is when one element's characteristics are added to another element's. Multiply is when one element's characteristics are multiplied with another element's. Divide is when one element's characteristics is divided by another element's.

For either or both of the above two embodiments, the re-compositing is alternatively not made permanent until the two-dimensional to three-dimensional conversion process is completed.

For either or both of the above two embodiments, the reconstructing of the one or more occluded regions of the one or more discrete elements is accomplished by a method selected from the group including, but not limited to: a manual procedural painting; a manual non-procedural painting; a matte painting; a computer generated replacement via three-dimensional model; a computer generated replacement via two-dimensional model; a computer generated replacement via particle system; a computer generated replacement via procedural scripting; a camera tracking, nodal tracking, planar tracking, motion vector tracking, and matchmoving; a model; a partially automated inpainting; a partially automated image filtering system; a fully automated inpainting; a fully automated image filtering system; or a grain removal, matching, and creation system.

For either or both of the above two embodiments, the re-compositing of the one or more reconstructed discrete elements is performed in an environment selected from the group including, but not limited to: a two-dimensional digital composite system; a two-and-a-half-dimensional ("2.5D") digital composite system; a three-dimensional digital composite system; a two-dimensional digital cg model creation system; a 2.5D digital cg model creation system; a three-dimensional digital cg model creation system; a two-dimensional digital animation system; a 2.5D digital animation system; a three-dimensional digital animation system; a two-dimensional digital editing system; a 2.5D digital editing system; a three-dimensional digital editing system; a two-dimensional digital lighting system; a 2.5D digital lighting system; or a three-dimensional digital lighting system.

The segmented and/or reconstructed and/or substituted discrete elements or discrete element sequences may be encoded out into image file sequences or image sequence container files if computational, storage, platform, or application conflicts prevent the segmentation process step and/or the reconstruction/substitution process step and/or the re-composite process step and/or the monoscopic image sequence to stereoscopic image sequence process step from occurring within one encompassing system.

Encoding may be, but is not limited to: image sequence file types—jpeg, png, tiff, targa, cineon, dpx, exr, etc; or image sequence container files—QuickTime® movie, mpeg, mp4, Windows® media file, or Matroska®.

BRIEF DESCRIPTION OF THE DRAWINGS

The techniques discussed herein can be better understood with reference to the following drawings. Those of skill in the art will understand that the drawings, described below, are for illustrative purposes only. The drawings are not intended to limit the scope of the present teachings in any way.

FIG. 1A is a flow diagram illustrating an exemplary embodiment of a method of preparing a two-dimensional image to be converted into a three-dimensional image.

FIG. 13 further illustrates use of an embodiment of an alpha channel that is used to reintroduce transparency to elements with inherent transparency or translucency (e.g., the lens flare element).

DETAILED DESCRIPTION

Figure 1B:
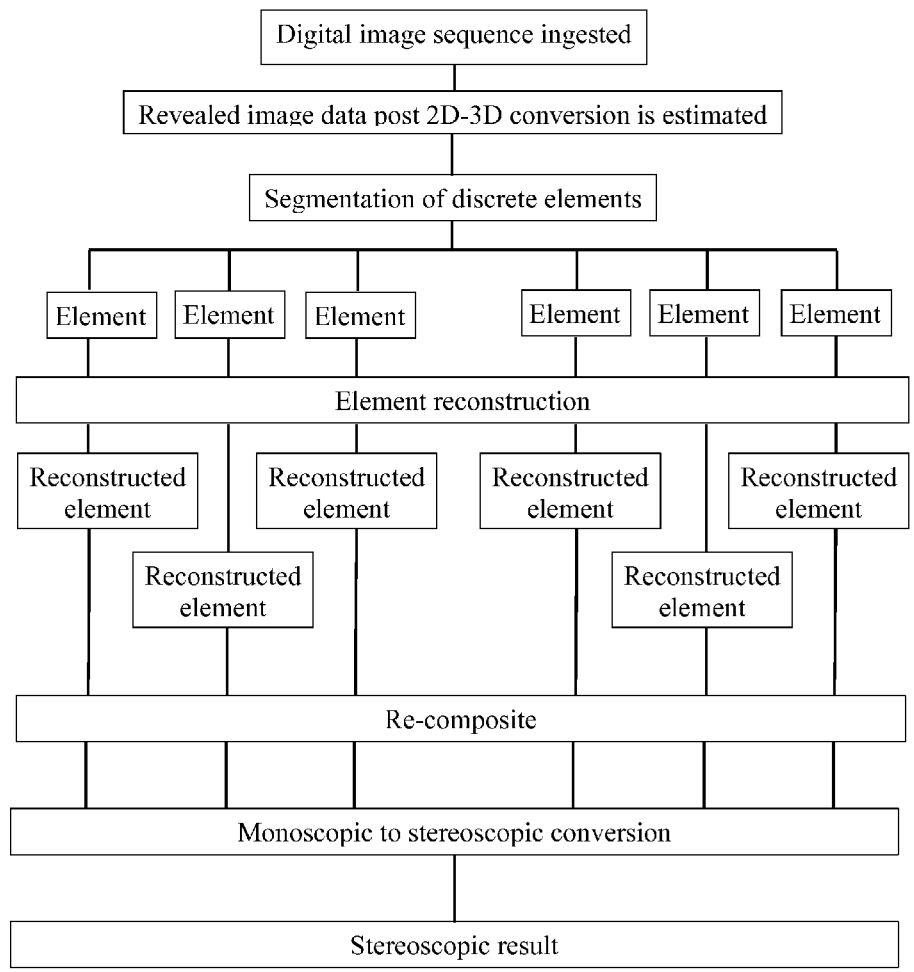
FIG. 1B depicts a representative environment for practicing the techniques described in the present application.

In the following detailed description of various embodiments of the invention, numerous specific details are set forth in order to provide a thorough understanding of various aspects of one or more embodiments of the invention. However, one or more embodiments of the invention may be practiced without some or all of these specific details. In other instances, well-known methods, procedures, and/or components have not been described in detail so as not to unnecessarily obscure aspects of embodiments of the invention.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the screen shot figures, and the detailed descriptions thereof, are to be regarded as illustrative in nature and not restrictive. Also, the reference or non-reference to a particular embodiment of the invention shall not be interpreted to limit the scope of the invention.

In the following description, certain terminology is used to describe certain features of one or more embodiments of the invention. For instance, 2D image, two-dimensional image, and monoscopic image all refer to an image that was captured with the original intention of presentation through a single perspective or view. 3D image, S3D image, three-dimensional image or a stereoscopic image refers to an image pair in which one eye is focused on one of the images of the pair and the other eye focuses on the second image of the pair. In this circumstance the stereoscopic image pair may be captured by an actual dual camera setup, a synthetic dual camera setup, or may be generated from a monoscopic image source through various 2D to 3D conversion methods. 2D to 3D image conversion refers to the process in which a 2D image is modified or manipulated in order to create a complementary stereoscopically paired image or create a plurality of stereoscopically paired images. Compositing refers to the digital method of combining two or more images using operating scripts based off of mathematical expressions.

As used herein, the term "image sequence" is broadly defined to include a series of individual images that when played in order, create a motion picture. Image sequences can be stored analog on film strips and/or may be processed into a computer as image sequence container files or as individually numbered images that can be imported in order to create an image sequence.

As used herein, the term "2.5D" is broadly defined to include images or processes that exhibit some but not all three dimensional properties. When used in a specific manner, 2.5D images or processes can give the illusion of being fully three dimensional.

As used herein, the term "alpha" is broadly defined to include the transparency information of an image. In digital compositing, an alpha channel can be represented as an embedded data channel in a digital file or a separate grayscale raster image.

As used herein, the term "RGB" is broadly defined to include image data that is encoded to create a visual record file that maintains discrete records of each additive primary color channel: Red, Green, and Blue. The term "RGBA" refers to the same RGB record, with one additional "alpha" channel for transparency information.

As used herein, the term "pre-composing" is broadly defined to include performing a render operation specifically before taking the finished composite and composing it with another element. This order of operations prevents unintended compositing operations from being performed.

As used herein, the term "pre-visualizing" is broadly defined to include creating a proxy rendition of a final product, far before the final product is produced in order to get a rough idea of what the final product will look like and to make decisions about changes that could be much more costly near the final stages of final product completion.

As used herein, the term "ingesting" is broadly defined to include importing data into a pipeline, workflow, or process.

As used herein, the term "re-compositing environment" is broadly defined to include the structure and workflow in which the re-composite phase is being carried out. Example include a node based compositing system, a CG generation application, or a command line based encoder.

Although a single still image is shown in the Figures, it should be understood that the single still image may represent a sequence of images that would preferably be processed by the method of the present invention.

Although the following description thoroughly explains the entire process and how it ties into a 2D to 3D conversion process, the purpose and general decomposite process can be explained in far less detail. The 2D to 3D conversion process is the act of creating two distinct perspective views of a recorded visual media from a single original perspective view of a recorded visual media. Parrallax is introduced in the process, and areas that could not be seen in the single original view are revealed after the process. The decomposite techniques introduced herein pre-treat these revealed surfaces by generating the revealed surface data while the image is still in 2D form. The process requires that elements within the recorded visual media that have distinct distances from the viewer of the recorded visual media are segmented and reconstructed, only to be composited back together procedurally prior to completion of the 2D to 3D conversion process. Although the method is tied to the 2D-3D conversion process in that it pre-processes or "prepares" input data fed into the conversion process, it is still procedurally distinct and independent from the 2D-3D conversion process.

In embodiments, determining depth (implied or exact) of the various elements of an image is typically accomplished through an analysis of one or more depth cues. The depths cues include, but are not limited to: an atmospheric contrast; a volumetric light; a relative size of one or more objects in relation to a standard size of the one more objects; the relative size of the one or more objects in relation to the one or more objects proximity to a horizon; one or more foreground objects occluding one or more background objects; a relative speed of one or more moving objects over an equal distance; or a color, a shadow, and/or a lighting of the one or more objects.

FIG. 1A is an exemplary flow diagram illustrating an exemplary embodiment of a method of preparing a two-dimensional image to be converted into a three-dimensional image. As will be described with respect to FIG. 1B, in embodiments, implementation of the method is accomplished by use of one or more computers. It is understood that some or all steps illustrated here are automatic (i.e., may be performed directly by the computer without any human intervention), while some steps may require at least some human intervention prior to or subsequent to completion of the step. Although the listed steps are preferred in one embodiment, it is not required that each and every step listed in FIG. 1 be practiced. Additionally, while the exemplary embodiment of FIG. 1 implies a certain sequence of processing, it is understood that such a sequence is for the purpose of illustration only and that a different ordering of the steps may also be contemplated as may be understood by a person of ordinary skill in the art. At block 10, FIG. 1 illustrates ingestion of a digital image or a digital image sequence into a computer.

The sequence may be, for example, an originally digital file, an analog file, or a film strip that has been converted into a digital file. In embodiments, the input may also include multi-view assets received from various sources. A multi-view asset may already have "3D" information in them (e.g., through capture of information using 3D cameras), but such multi-view assets may still be incomplete or not have complete 3D occluded region information to be able to effectively placed in conjunction with other images in the sequence. Accordingly, if a multi-view asset is received, such an asset is converted to formats acceptable by the system described herein and further processing continues as with other non-multi-view assets. In embodiments, when such assets are received, for example from an external studio, preliminary processes may need to be performed to ensure compliance or coordination with present processes. For example, when a 3D asset plate is received, 3D elements may be teased out from the 2D elements. The 3D objects may have the following done to ensure that they match other 2D/3D properties: the objects may be reshaped, depth grading (or existing depth grade altered) may be performed to match depth grading trends of existing/processed assets, matching steps may be performed to match render aspect of the received assets with existing assets, etc. In this aspect, the conversion techniques illustrated herein cover not just 2D to 3D conversion, but also 3D to 3D conversion to ensure quality of final 3D product. Additionally, it is understood that the input image format may be inclusive of all types of formats as understood by a person of ordinary skill in the art, including formats such as the DEEP format. Further, in at least some embodiments, it is understood that the generated 3D data may include the ability to develop multiple perspectives for specific displays such as an auto stereo screen.

In embodiments, as illustrated in block 20, the method includes a step of estimating the image data that will be revealed after the 2D to 3D conversion process. The estimation of the occluded regions may be accomplished by known methods and systems, including, but not limited to pre-visualizing a partial or full 2D to 3D conversion of the original sequence of two-dimensional digital images and offsetting the one or more discrete elements accordingly. This step enables identification or estimation of occluded regions of interest. In this manner the occluded regions of the discrete elements may be reconstructed based on the pre-visualization estimation. The identified occluded regions are then fully or partially reconstructed, as may be necessitated on a case-by-case basis. Subsequently, the method progresses to block 30, where the image (or image sequence as the case may be) is segmented, resulting in discrete elements as identified in blocks 40. In embodiments, the segmentation step 30 is accomplished through known methods, including, but not limited to: rotoscoping the single two-dimensional digital image manually through an operator (or artist); rotoscoping the single two-dimensional digital image partially manually and partially automatically; procedural color keying luminance keying; procedural color keying color difference keying; selective image isolation through motion vector analysis; selective image isolation through planar tracking; or selective image isolation through camera solving.

In embodiments, the segmented elements identified in block 40 may be isolated individually, as will further be illustrated in reference to FIGS. 4-12 below, in order to more easily reconstruct them. Subsequently, as illustrated in block 50, each of the discrete elements may be reconstructed to generate segmented and reconstructed elements. Such reconstructed elements are illustrated in blocks 60. In embodiments, such reconstruction may be performed using various known methods, including, but not limited to: a manual procedural painting; a manual non-procedural painting; a matte painting; a computer generated replacement via three-dimensional model; a computer generated replacement via two-dimensional model; a computer generated replacement via particle system; a computer generated replacement via procedural scripting; a camera tracking, nodal tracking, planar tracking, motion vector tracking, and matchmoving; a model; a partially automated inpainting; a partially automated image filtering system; a fully automated inpainting; a fully automated image filtering system; and/or a grain removal, matching, and creation system.

In some embodiments, the reconstructed elements identified in blocks 60 may be re-composited through know methods as is illustrated in block 70. Re-composition may be performed using known processes, including but not limited to: Over; Add; Multiply; Divide; etc. Over is when one element is placed over another element. Add is when one element's characteristics are added to another element's. Multiply is when one element's characteristics are multiplied with another element's. Divide is when one element's characteristics is divided by another element's. The environment for re-compositing 70 of the reconstructed discrete elements 60 is preferably done in a known environment, including, but not limited to: a two-dimensional digital composite system; a two-and-a-half-dimensional ("2.5D") digital composite system; a three-dimensional digital composite system; a two-dimensional digital cg model creation system; a 2.5D digital cg model creation system; a three-dimensional digital cg model creation system; a two-dimensional digital animation system; a 2.5D digital animation system; a three-dimensional digital animation system; a two-dimensional digital editing system; a 2.5D digital editing system; a three-dimensional digital editing system; a two-dimensional digital lighting system; a 2.5D digital lighting system; and/or a three-dimensional digital lighting system.

The above steps, covered approximately by blocks 10 through 70 illustrated an exemplary embodiment of the technique discussed herein to achieve the purpose of preparing a two-dimensional image prior to converting the two-dimensional image into a three-dimensional image. In embodiments, as discussed above, the above process may inherently be tied to and be part of an overall 2D-3D conversion process or may be procedurally isolated from such a 2D-3D conversion process. In the illustrated example of FIG. 1, the segmented, reconstructed, and/or re-composited elements are then ingested into a 2D to 3D conversion process, as illustrated in block 80. The 2D-3D conversion process of block 80 generates a stereoscopic image pair of the original image. In embodiments, this conversion process may be accomplished through various known methods, including, but not limited to: two-dimensional image modifications driven by three-dimensional geometry manipulation systems; two-dimensional image modifications driven by two-dimensional depth map systems; two-dimensional image modifications driven by color or luminance systems; two-dimensional image modifications driven by two-dimensional warping and filtering systems; two-dimensional image manipulations driven by motion vector estimation systems; two-dimensional image manipulations driven by temporal estimation systems; three-dimensional modeling and texturing based off of camera tracking or solving systems; three-dimensional modeling and texturing systems; three-dimensional modeling and displacement systems; or three-dimensional modeling and/or projection systems.

FIG. 1B and the following discussion now provide a brief, general description of a representative environment for practicing the techniques described, for example, in FIG. 1. Although not required, aspects of the invention may be described below in the general context of computer-executable instructions, such as routines executed by a general-purpose data processing device (e.g., a server computer or a personal computer). Those skilled in the relevant art will appreciate that the invention can be practiced with other communications, data processing, or computer system configurations, including: wireless devices, Internet appliances, handheld devices (including personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "server," and the like are used interchangeably herein, and may refer to any of the above devices and systems. While aspects of the invention, such as certain functions, are described as being performed exclusively on a single device, the invention can also be practiced in distributed environments where functions or modules are shared among disparate processing devices. The disparate processing devices are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nano-technology memory, biological memory, or other data storage media. Alternatively, computer implemented instructions, data structures, screen displays, and other data related to the invention may be distributed over the Internet or over other networks (including wireless networks), on a propagated signal on a propagation medium (e.g., an electromagnetic wave(s), a sound wave, etc.) over a period of time. In some implementations, the data may be provided on any analog or digital network (packet switched, circuit switched, or other scheme).

As shown in FIG. 1B, a 3D server 1120 may be utilized for performing the various functions described with reference to FIG. 1A. In the illustrated embodiment, the 3D server 1120 may include a computation block, 3D comp 1175, that includes a plurality of modules for performing one or more of the described functions. The 3D comp block 1175 can be implemented by using programmable circuitry programmed by software and/or firmware, or by using special-purpose hardwired circuitry, or by using a combination of such embodiments. In some instances, the computation subsystem 860 is implemented as a logical or functional unit in a processor of the 3D server 1120. The ingest module 1175 performs, for example, the above described functions associated with block 10 of FIG. 1A. The estimation module 1175B performs estimation of eventual 3D rendering as described with reference to block 20 of FIG. 1A. The segmentation module 1175C performs functions associated with segmenting the various elements of a 2D image, described for example with reference to block 30 of FIG. 1A. The reconstruction module 1175D implements routines and algorithms related to reconstruction of occluded regions, as described with reference to block 50 of FIG. 1A. The recomposition module 1175E performs various functions associated with reconstruction of a 2D image after reconstruction is done, as described above with reference to block 70 of FIG. 1A. The 3D conversion module 1175F is associated with the actual 2D to 3D conversion processes, the functions of which, while being a part of a 3D conversion process, are still ancillary to the decomposition and 2D image preparation techniques discussed herein.

It is noted that various aspects of the techniques discussed herein may be performed in a distributed manner across several computers. For example, clients 1130A and 1130B may communicate with the 3D server 1120 to access the 3D Comp 1175 computational resources to perform one or more functions related to preparing the 2D image. In some instances, the clients may themselves have inbuilt 3D blocks for performing the various functions. The distributed computers may, in embodiments, communicate over a communication network 1110. The network 1110 may be, for example, an internal network specific to an organization or the Internet. In embodiments, the image content is available to the distributed network or the individual computing devices from a content storage repository 1180 accessible over the network 1110.

It is further noted that not all functions performed by the various computational modules are completely automatic or sequential in operation. For example, an operator may utilize automated routines of the estimation module 1175B, to determine regions that will be likely revealed during a 3D conversion process. However, while the segmentation module may still be performed using computing routines offered by the segmentation module 1175C, the operator may need to manually operate on the images using tools offered by the segmentation module 1175C to carve out and isolate various segments of the images. In some instances, of course, the segmentation module 1175C may automatically identify such segments without any human intervention. It is also noted that the 3D comp block 1175 described herein may only contain blocks 1175A through 1175E, leaving out the actual 2D-3D conversion process to be done at different machines or different computing mechanisms. Further, it is noted that the computational sub-blocks of 3D comp 1175 are not necessarily discrete elements, and that the elements may all be combined as a single or multiple computational blocks capable of providing and enabling software routines that enable an operator to perform the various tasks of preparing a 2D image as described herein.

Figure 1C:
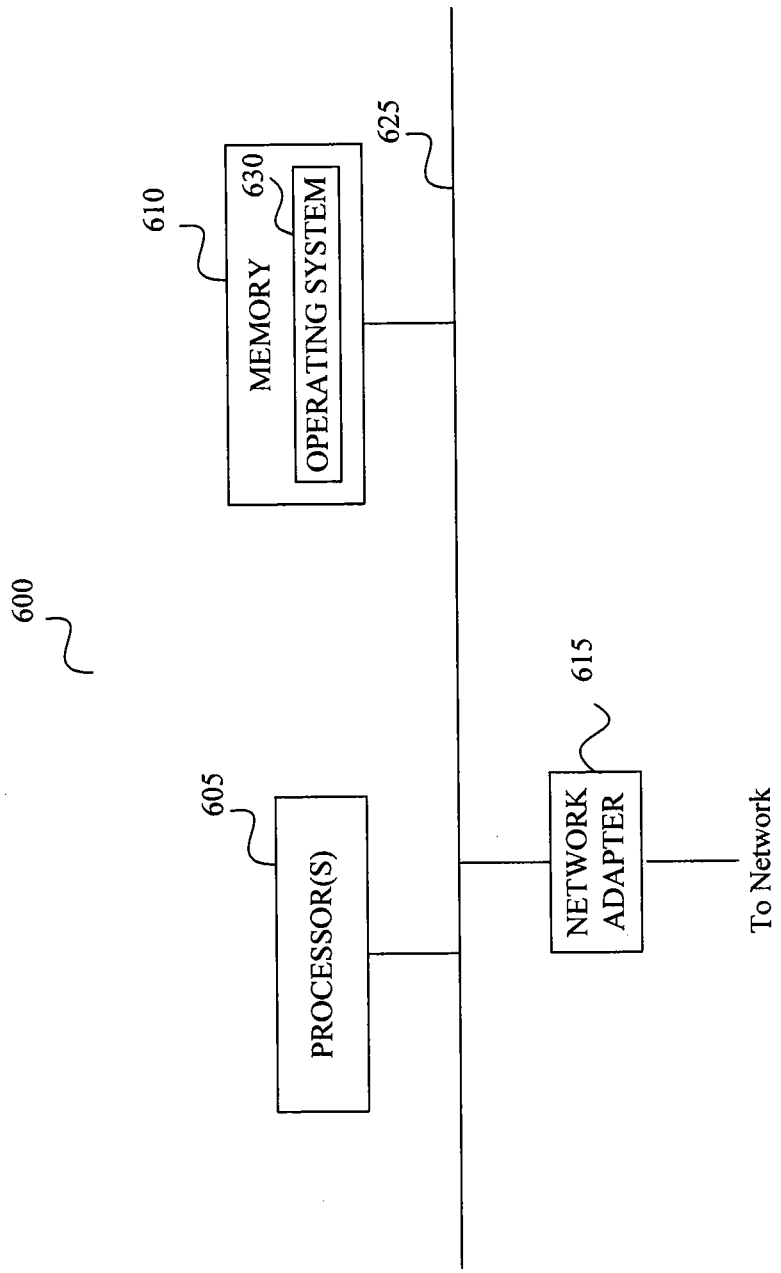
FIG. 1C is a high-level block diagram showing an example of the architecture for a computer system that can be utilized to implement the techniques discussed herein.

FIG. 1C is a high-level block diagram showing an example of the architecture for a computer system 600 that can be utilized to implement a 3D server 1120, a client 1130A, or any computer or computers that may be utilized for performing the various functions described herein. In FIG. 1C, the computer system 600 includes one or more processors 605 and memory 610 connected via an interconnect 625. The interconnect 625 is an abstraction that represents any one or more separate physical buses, point to point connections, or both connected by appropriate bridges, adapters, or controllers. The interconnect 625, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 694 bus, sometimes referred to as "Firewire."

The processor(s) 605 may include central processing units (CPUs) to control the overall operation of, for example, the host computer. In certain embodiments, the processor(s) 605 accomplish this by executing software or firmware stored in memory 610. The processor(s) 605 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 610 is or includes the main memory of the computer system 1100. The memory 610 represents any form of random access memory (RAM), read-only memory (ROM), flash memory (as discussed above), or the like, or a combination of such devices. In use, the memory 610 may contain, among other things, a set of machine instructions which, when executed by processor 605, causes the processor 605 to perform operations to implement embodiments of the present invention. Also connected to the processor(s) 605 through the interconnect 625 is a network adapter 615. The network adapter 615 provides the computer system 600 with the ability to communicate with remote devices, such as the storage clients, and/or other storage servers, and may be, for example, an Ethernet adapter or Fiber Channel adapter.

Figure 2:
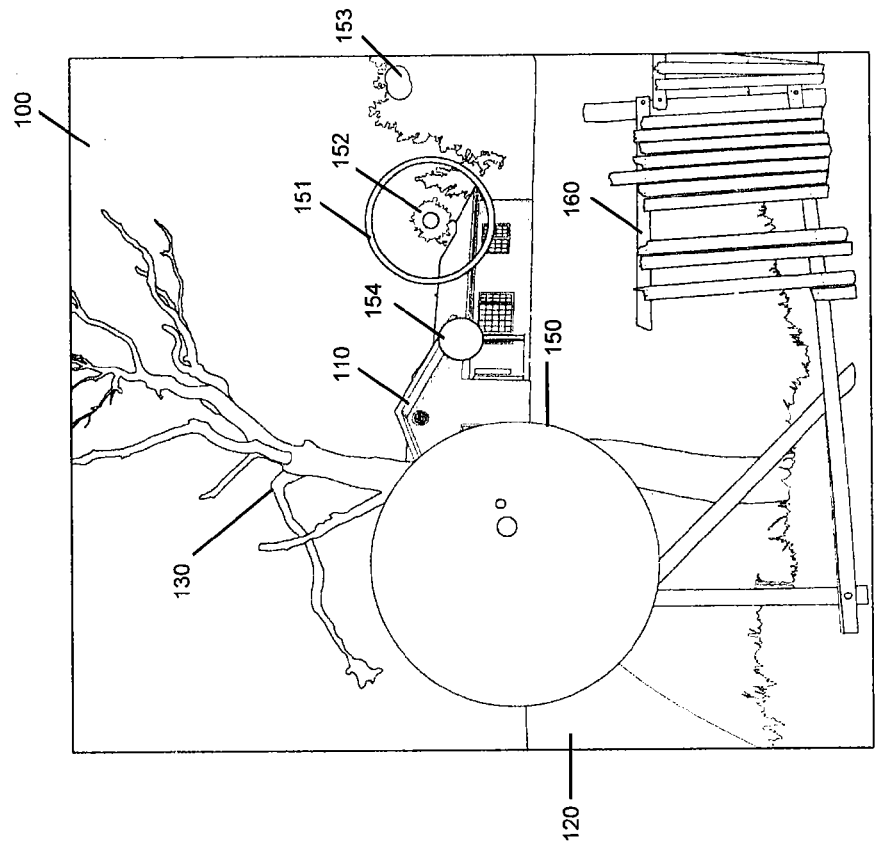
FIG. 2 is an example of an original monoscopic image to be prepared for a two-dimensional to three-dimensional conversion process.

Returning back to the preparation of 2D images for eventual use in 2D-3D conversion routines, FIG. 2 now illustrates an example of an original monoscopic image that is to be prepared for a two-dimensional to three-dimensional conversion process. FIG. 2 illustrates how an image may contain many discrete elements. In this example, the sky 100 and house 110 are background elements. The ground 120 is a mid-ground element, and the lens flare 150, tree 130, and fence 160 are foreground elements. These discrete elements are isolated from each other during the segmentation process explained above with respect to FIGS. 1A and 1B.

Figure 3:
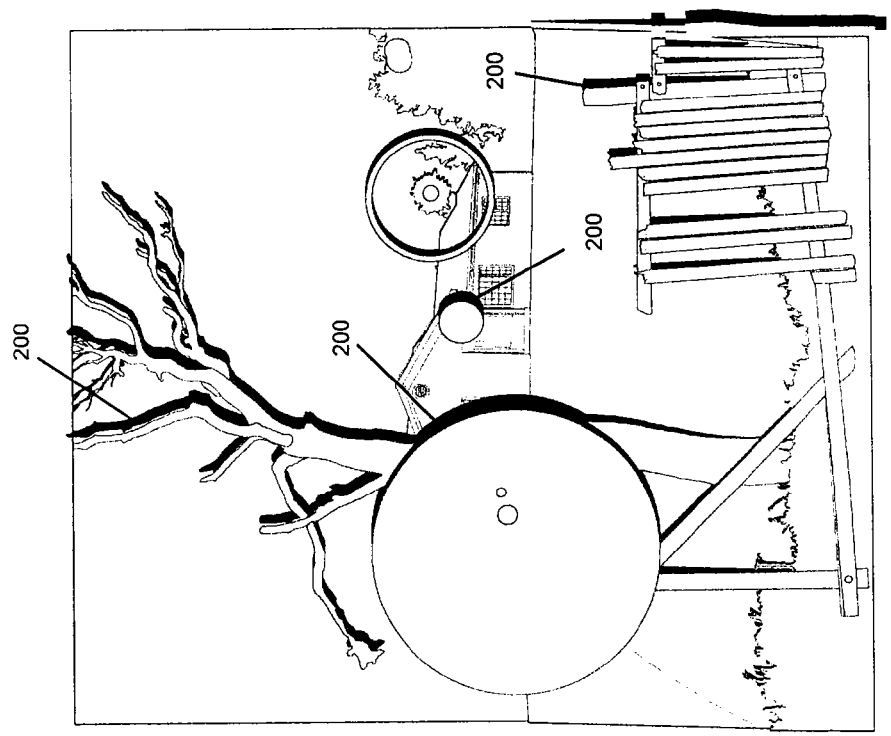
FIG. 3 is the illustration of an exemplary complementary image created from the original monoscopic image of FIG. 2 as a result of a 2D to 3D conversion process.

FIG. 3 illustrates an exemplary embodiment of a complementary image created from the original monoscopic image of FIG. 2 as a result of a 2D to 3D conversion process. FIG. 3 depicts how the discrete elements in the original monoscopic image of FIG. 2 have shifted at varying distances horizontally (relative to the image in FIG. 2) depending on the relative depth of the element in the original FIG. 2 image. The lens flare 150, 151, 152, 153 and 154, tree 130, and fence 160 are the elements closest to the viewer, so their horizontal shift is greater than that of the background elements sky 100 and house 110. FIG. 3 also illustrates how the creation of the complementary image reveals newly visible areas on some of the elements that were formerly occluded by the original placement of other discrete elements. These occluded areas, or artifacts of the 2D to 3D conversion process, 200 are shown in FIG. 3 as black solids, because the image data is missing. The artifacts must have the image data reconstructed so that the alternate image can be complete and not be distracting to the viewer. Once complete, the images in FIGS. 2 and 3 would form a pair of images that can present the viewer with a stereoscopic perspective.

FIG. 3 represents a prior art scenario where the complementary image is created after it has been processed in 2D to 3D conversion. This image can be viewed in tandem with the original image to form a stereoscopic image pair, but the stereoscopic view suffers from distracting artifacts in the complementary view. The artifacts are missing image data revealed as a concomitant problem with the 2D to 3D conversion process. The arrows 200 in FIG. 3 point to blank portions of the image that were occluded in the original image and are now revealed by the 2D to 3D conversion process. This image, as illustrated in FIG. 3, has not been through the preparation method of the present invention, so the correct image data is not available for the occluded areas and they have been filled with a solid color.

Figures 4, 5:
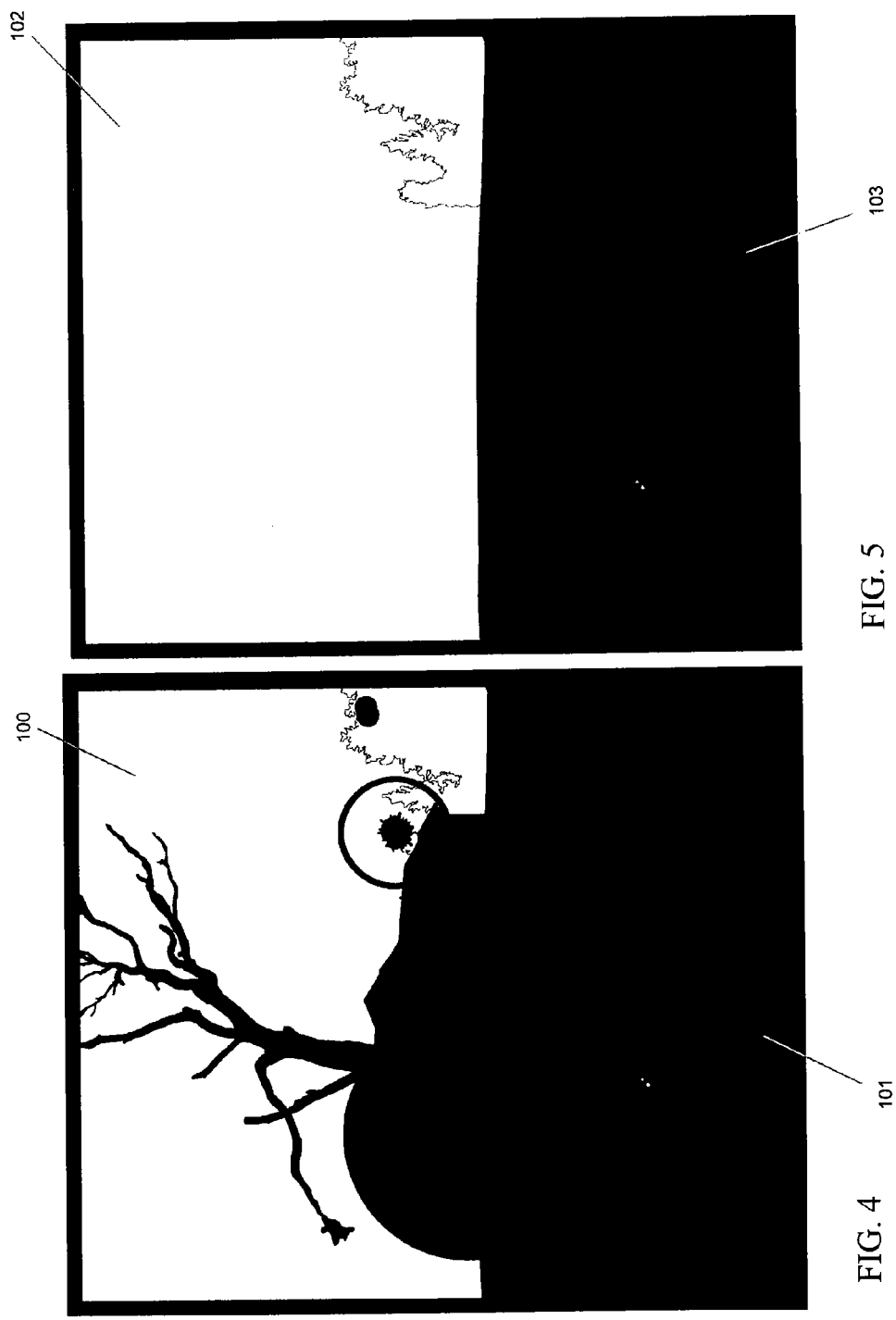
FIG. 4 illustrates an example of an element (e.g., the "sky" element) that has been segmented and isolated from the original monoscopic image.
FIG. 5 illustrates an example of reconstruction of a segmented element (e.g., the sky element).

FIG. 4 now illustrates a scenario that utilizes the techniques of the present application. FIG. 4 depicts an example of an element (e.g., the "sky" element 100) that has been segmented and isolated from the original monoscopic image (e.g., as a result of the segmentation process 30 of FIG. 1A). FIG. 4 shows in white the isolated and segmented sky element 100. The other elements 101, some of which occlude portions of the sky 100, are shown as blank. The blankness of the other elements 101 is temporary and allows the sky 100 to be shown as isolated so that it can be reconstructed more easily.

FIG. 5 illustrates an example of reconstruction of a segmented element (e.g., the sky element). FIG. 5 illustrates how the sky element is reconstructed to create the reconstructed sky element 102. The remainder of the image 103 is shown as temporarily blank. The sky element is preferably reconstructed based on contextual information within the scene, such as the orientation of the clouds and the general uniformity in the texture of the sky itself. Although FIG. 5 shows that the entire sky above the ground is fully reconstructed, preferably, the reconstruction is only carried out as much as is needed based on the estimations of how much newly visible matter of the element will be shown after the offset during the 2D to 3D process. Estimations can be carried out by setting up offset values ahead of the reconstruction step, by pre-visualizing a partial or full 2D to 3D conversion of the monoscopic original image, and/or by attempting to reconstruct all portions of the element that were occluded.

Figures 6, 7:
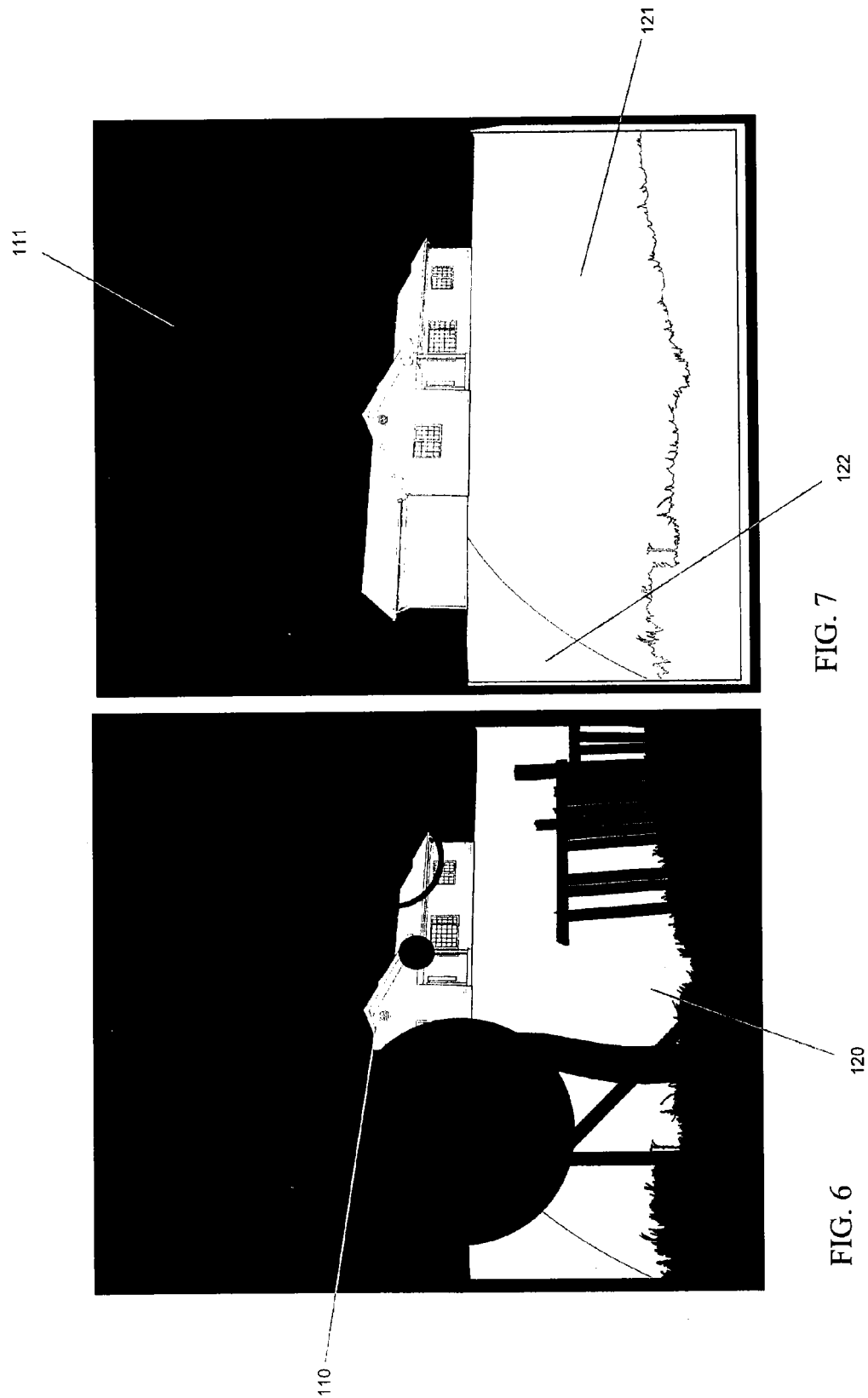
FIG. 6 illustrates an example where two elements (e.g., the house and ground elements) that have been segmented and isolated together.
FIG. 7 illustrated reconstruction of the segmented elements of FIG. 6.

FIG. 6 illustrates an example where two elements (e.g., a house element 110 and a ground element 120) are segmented and isolated together as one element. In this example, the decision to segment the house 110 and the ground 120 together is based on the fact that the house 110 does not directly occlude any portion of the ground 120 that would be revealed as a result of the 2D to 3D conversion process.

FIG. 7 now illustrates reconstruction of the segmented house and ground elements. FIG. 7 illustrates a scenario where the reconstructed house 111 has been reconstructed based on other images of the house, contextual data, and even assumptions, such as assuming that the house is symmetrical. Additionally, FIG. 7 shows that the reconstructed ground 121 has been reconstructed based on contextual image data and now the path 122 to the house 111 is revealed.

Figure 8:
FIG. 8 illustrates an example of another element (e.g., the tree element) that has been segmented and isolated.

FIG. 8 is an illustration of segmentation and isolation of the tree element 130. FIG. 8 shows the tree element 130 as an isolated and segmented element.

Figure 9:
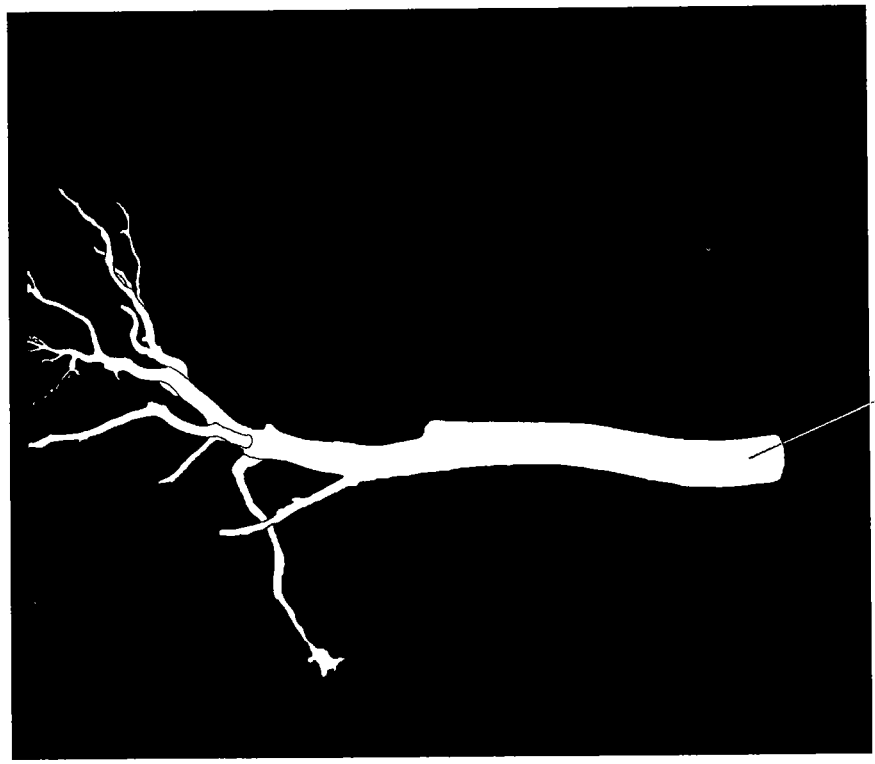
FIG. 9 illustrates reconstruction of the segmented element of FIG. 8.

FIG. 9 is illustrated reconstruction of the segmented tree element 130. FIG. 9 shows that the reconstructed tree 131 has a trunk from the ground all the way to the branches. This is a further example of reconstruction through context and assumption.

Figure 10:
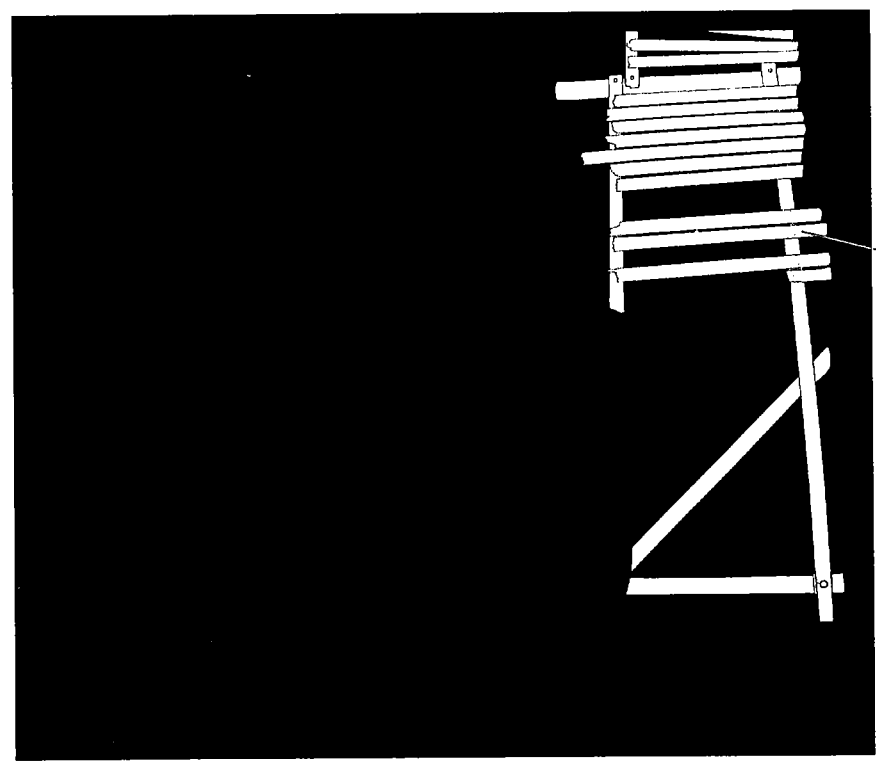
FIG. 10 illustrates segmentation and isolation of another segmented and isolated element (e.g., the fence element).

FIG. 10 is an illustration of segmentation and isolation of the fence element. FIG. 10 shows fence element 160 as an isolated and segmented element.

Figure 11:
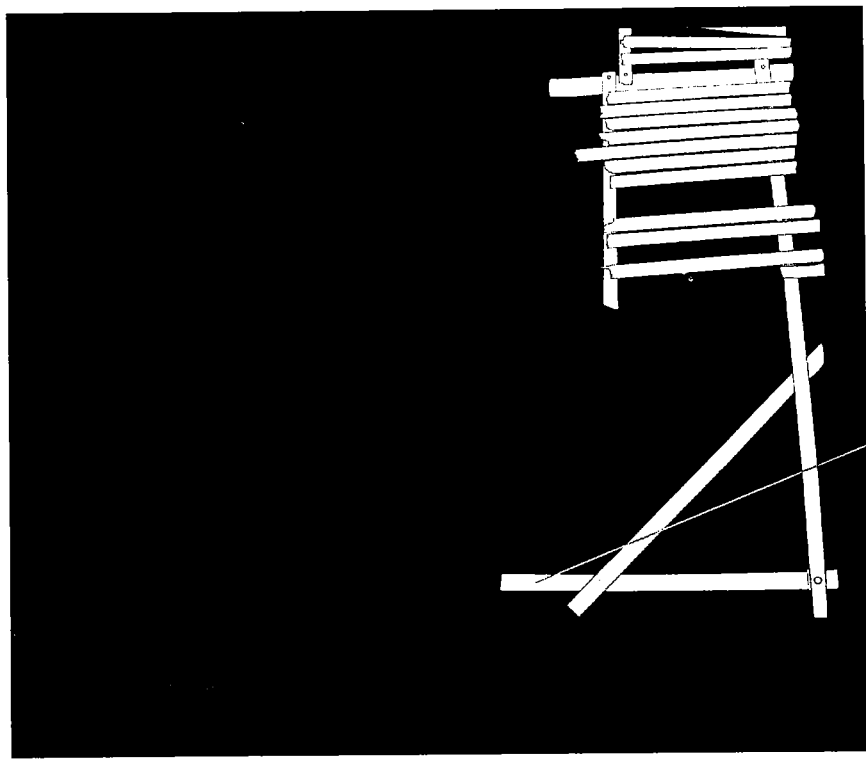
FIG. 11 illustrates reconstruction of the element of FIG. 10.

FIG. 11 is an illustration of one embodiment of the reconstructed and segmented fence element. The reconstructed fence 161 is now completely visible.

Figures 12, 13:
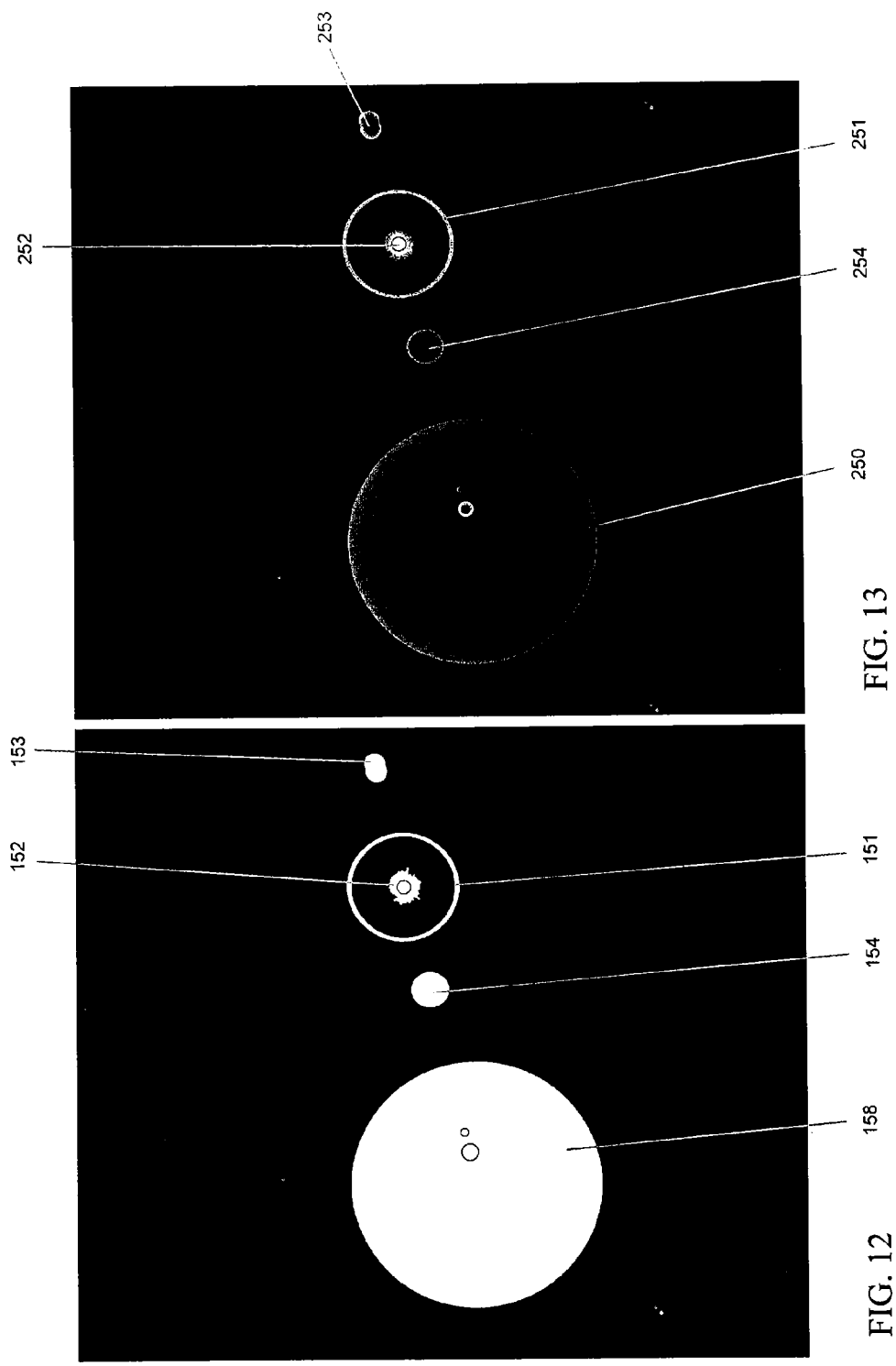
FIG. 12 illustrates yet another element (e.g. the lens flare element) after it has been segmented and isolated.
FIG. 13 illustrates reconstruction of the segmented element of FIG. 12.

FIG. 12 is an illustration of the lens Flare element after it has been segmented and isolated. As shown in FIG. 12, the lens flare 150, 151, 152, 153 and 154, is a scattered element. Although the lens flare 150, 151, 152, 153 and 154 is not occluded by any other element, it still needs to be reconstructed because the segmenting process may require that a previously transparent or semi-transparent element be turned into an opaque element. In embodiments, this may be accomplished by extracting the lens flare 150, 151, 152, 153 and 154 by means of, for example, an image keyer, and then removing any traces of the background image data using digital paint or color correction techniques. Alternatively, in embodiments, elements such as the lens flare 150, 151, 152, 153 and 154 can be recreated from scratch as an opaque element. The lens flare 150, 151, 152, 153 and 154 shown in FIG. 12 is opaque. As such, the lens flare 150, 151, 152, 153 and 154, after isolation and segmentation, needs to be reconstructed as a transparent element.

FIG. 13 illustrates reconstruction of the segmented element of FIG. 12. FIG. 13 further illustrates use of an embodiment of an alpha channel that is used to reintroduce transparency to elements with inherent transparency or translucency (e.g., the lens flare element). FIG. 13 displays the alpha channel that will be used to re-introduce transparency into the solid color of the recreated Lens Flare.

As shown in FIG. 13 the lens flare 250, 251, 252, 253 and 254 has been reconstructed as a gradated discrete element, representing the understood transparency of the lens flare element in FIG. 12. This element is known as an alpha channel. Alpha channels determine the transparency of an element, which in turn helps determine the appearance of the element when used in a composite. An alpha channel is represented as a grayscale image, where pure black represents full transparency (meaning no color data is sampled from the associated RGB channels), and pure white represents full opaqueness (meaning the complete color data is shown from the associated RGB channels). Shades of gray in between represent varying degrees of transparent RGB data.

Figure 14A:
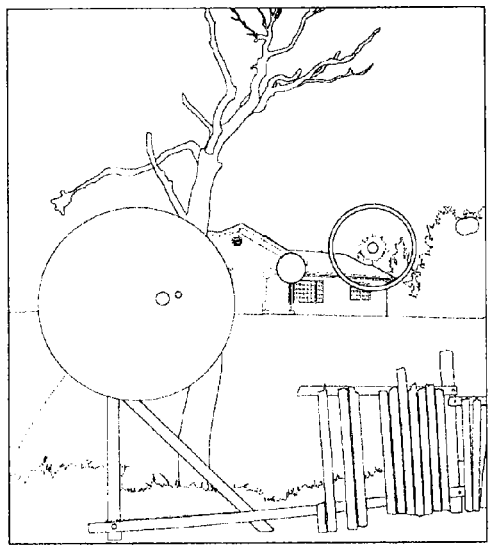
FIG. 14A is an illustration of an original monoscopic image that is the left eye view in a pair of stereoscopic images.

FIG. 14A is an illustration of an original monoscopic image that is the left eye view in a pair of stereoscopic images. Although FIG. 14A shows that one of the stereoscopic views may be the original monoscopic image, which is also shown in FIG. 2, the stereoscopic views may both be alternative images that have been through the preparation method discussed herein and the two-dimensional to three-dimensional conversion process.

Figure 14B:
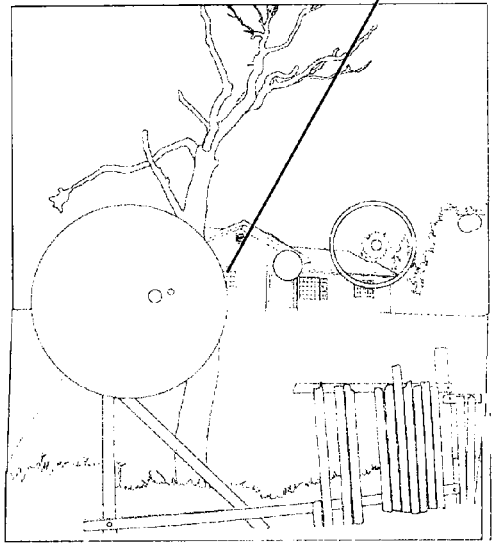
FIG. 14B is an illustration of one embodiment of a re-composited and converted image that is the right eye view in the pair of stereoscopic images.

FIG. 14B is an illustration of one embodiment of a re-composited and converted image that is the right eye view in the pair of stereoscopic images. FIG. 14B displays the reconstructed, re-composited, and converted complementary perspective image as the right side image. The left image, shown in FIG. 14A, is intended to be viewed only with the left eye, and the right image, shown in FIG. 14B, is intended to only be viewed with the right eye. As shown in FIG. 14B, previously occluded regions of the original image, shown in FIG. 14A, are now visible and accurately reconstructed. An example of the previously occluded, and now visible and accurately reconstructed region is area 400. Area 400 is the window of the house that is now visible. In this illustration, the window has been accurately reconstructed through the preparation process discussed herein, thus allowing the 2D to 3D conversion process to be accomplished much more efficiently, easily, and accurately.

Figure 15A:
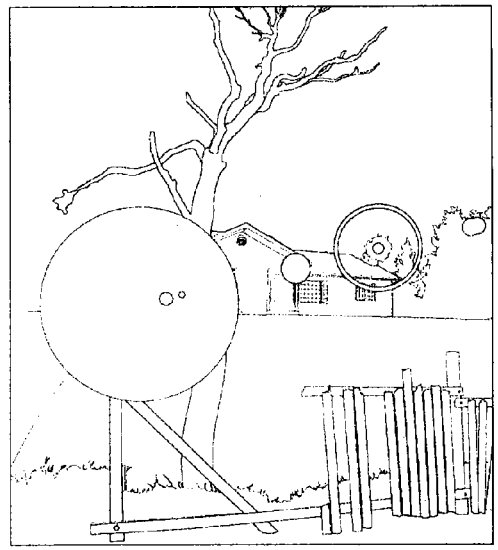
FIG. 15A is an illustration of one embodiment of the original monoscopic image that is the left eye view in a pair of stereoscopic images of FIG. 14A, with transparency in the lens flare element.

FIG. 15A illustrates an exemplary embodiment of the original monoscopic image that is the left eye view in a pair of stereoscopic images of FIG. 14A, with transparency in the lens flare element.

Figure 15B:
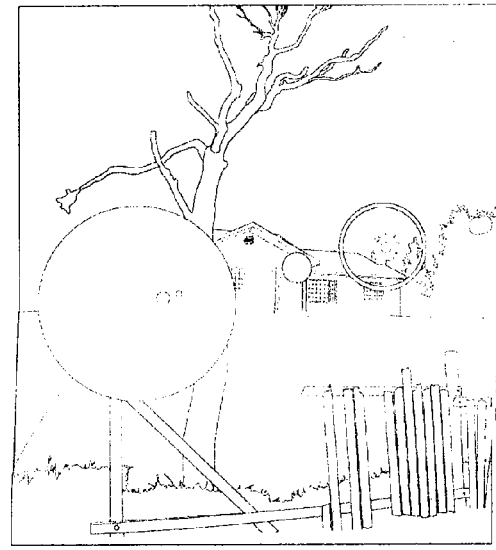
FIG. 15B is an illustration of the one embodiment of the re-composited and converted image that is the right eye view in the pair of stereoscopic images of FIG. 14B, with transparency in the lens flare element.

FIGS. 15A and 15B display the same results, but with the addition of transparency in the Lens Flare element.

Figure 16:
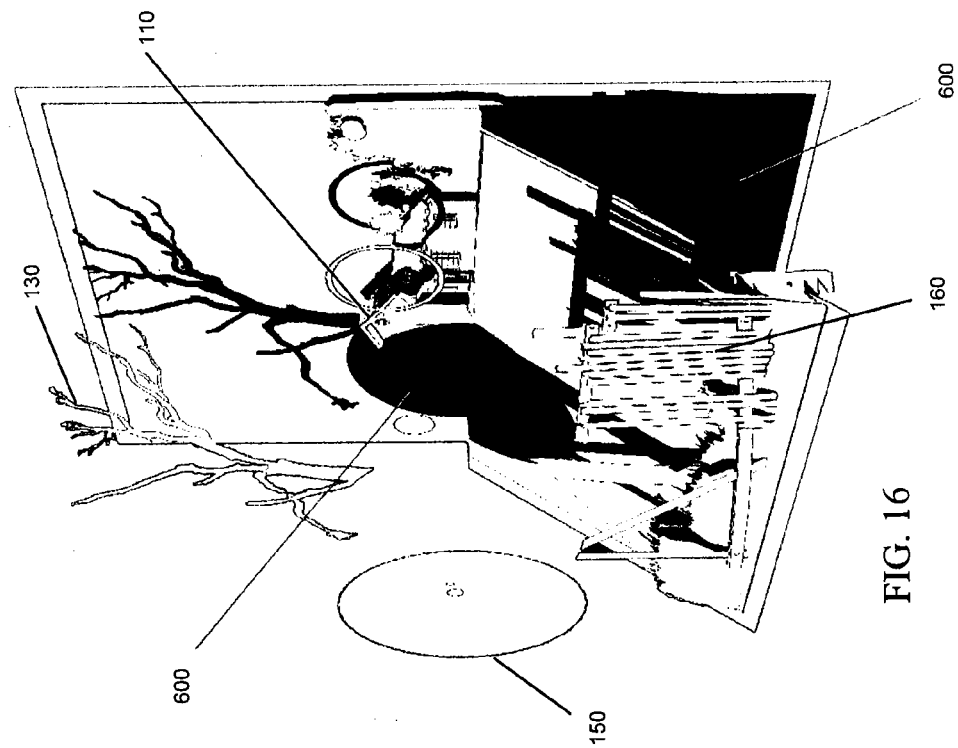
FIG. 16 is an illustration of a three-quarters view of the scene, depicted in the original monoscopic image of FIG. 2, after it has been composited without being prepared through the techniques introduced in the present application.

FIG. 16 is a three-quarters view of the scene depicted in the original monoscopic image shown in FIG. 2 after it has been composited without being prepared using the techniques discussed introduced in the present application. FIG. 16 displays a three-quarters perspective view of the original image with the discrete image elements, including lens flare 150, tree 130, and fence 160, isolated and segmented for the purpose of 2D to 3D conversion. But, the image in FIG. 16 did not undergo the "preparation" process of the present application. Consequently, the occluded areas 600 in FIG. 16 are not reconstructed. The occluded areas 600 would now need to be filled with image data, but because the two monoscopic images have a stereoscopic relationship, discretion must be taken to not adversely affect the stereoscopic discrepancies that have been precisely and carefully introduced between the two views. This process would require special tools and skills, and would consequently require a relatively exorbitant input of time and effort to bring to precision. Such a disadvantage of the prior art methodology of 2D to 3D conversion can be overcome by practicing the "preparation" process introduced herein.

Figure 17:
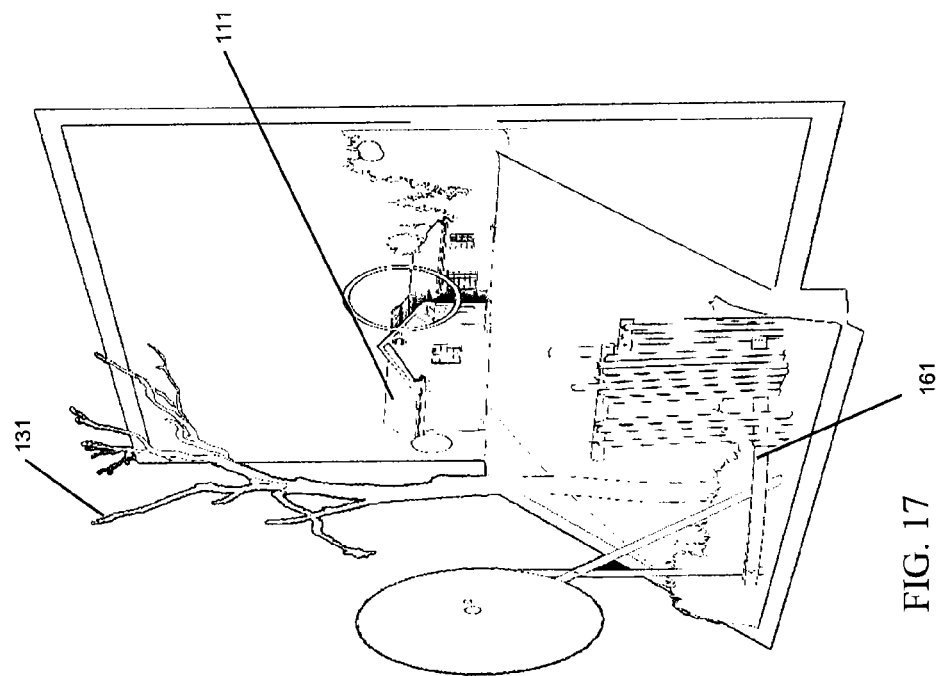
FIG. 17 is a three-quarters view of the scene, depicted in the original monoscopic image of FIG. 1, after it has been composited and prepared using the techniques introduced herein.

FIG. 17 is a three-quarters view of the scene, depicted in the original monoscopic image of FIG. 2 after the image has been composited and prepared using the techniques described herein. FIG. 17 displays a three-quarter perspective view of the reconstructed elements, including house 111, tree 131, and fence 161, being re-composited in order to be ingested in that state into the 2D to 3D conversion process. Because the file was previously prepared using the techniques described, for example, with respect to FIG. 1A, the occluded areas already contain correct image data, requiring no additional work in order to output a complete and accurate stereoscopic image pair after a 2D to 3D conversion.

The foregoing description of the preferred embodiment of the invention has been presented for the purposes of illustration and description. While multiple embodiments are disclosed, still other embodiments of the present invention will become apparent to those skilled in the art from the above detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope the invention. It is intended that the scope of the invention not be limited by this detailed description, but by the claims and the equivalents to the claims that are appended hereto.

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims

What is claimed is:

1. A method of preparing a two-dimensional image prior to subjecting the two-dimensional image through a two-dimensional to three-dimensional image conversion process, the method comprising:
    receiving, by a computing device, a two-dimensional digital image;
    identifying, using the computing device, one or more objects of the two-dimensional image;
    for each of the identified objects, segmenting a discrete element within said single two-dimensional digital image, each discrete element including a corresponding object and one or more occluded regions; and
    reconstructing said one or more occluded regions of each discrete element.

2. The method of claim 1, further comprising:
    ingesting said one or more reconstructed discrete elements into a two-dimensional to three dimensional conversion process;
    initiating said two-dimensional to three dimensional conversion process.

3. The method of claim 2, wherein said one or more reconstructed discrete elements include a plurality of revealed image data in the place of previously one or more occluded regions.

4. The method of claim 3, further comprising:
    re-composting said one or more reconstructed discrete elements;
    ingesting said one or more reconstructed and re-composted discrete elements into said two-dimensional to three dimensional conversion process.

5. The method of claim 4, further comprising:
    wherein said one or more reconstructed discrete elements are re-composted in a monoscopic state that approximates said single two-dimensional digital image prior to segmentation.

6. The method of claim 4, wherein said re-compositing of said one or more reconstructed discrete elements is accomplished using one or more of: Over; Add; Multiply; or Divide.

7. The method of claim 6, wherein said re-compositing is not made permanent until said two-dimensional to three-dimensional conversion process is completed.

8. The method of claim 4, wherein said re-compositing of said one or more reconstructed discrete elements is performed in one or more of:
    a two-dimensional digital composite system;
    a 2.5D digital composite system;
    a three-dimensional digital composite system;
    a two-dimensional digital cg model creation system;
    a 2.5D digital cg model creation system;
    a three-dimensional digital cg model creation system;
    a two-dimensional digital animation system;
    a 2.5D digital animation system;
    a three-dimensional digital animation system;
    a two-dimensional digital editing system;
    a 2.5D digital editing system;
    a three-dimensional digital editing system;
    a two-dimensional digital lighting system;
    a 2.5D digital lighting system; or
    a three-dimensional digital lighting system.

9. The method of claim 3, further comprising:
    estimating one or more occluded regions by pre-visualizing said two-dimensional to three dimensional conversion process of said single two-dimensional digital image and offsetting said one or more discrete elements accordingly;

wherein said one or more occluded regions of said one or more discrete elements is reconstructed based on pre-visualization estimation;

pre-composing said one or more discrete elements as encoded RGB, RGBA, or RGB and alpha image files prior to ingestion of said one or more discrete elements into said two-dimensional to three dimensional conversion process.

10. The method of claim 3, further comprising:

pre-composing said one or more discrete elements as encoded RGB, RGBA, or RGB and alpha image files prior to ingestion of said one or more discrete elements into said two-dimensional to three dimensional conversion process.

11. The method of claim 3, wherein one or more alternate perspective images during said two-dimensional to three dimensional conversion process are a result of one or more of:

two-dimensional image modifications driven by three-dimensional geometry manipulation systems;
two-dimensional image modifications driven by two-dimensional depth map systems;
two-dimensional image modifications driven by color or luminance systems;
two-dimensional image modifications driven by two-dimensional warping and filtering systems;
two-dimensional image manipulations driven by motion vector estimation systems;
two-dimensional image manipulations driven by temporal estimation systems;
three-dimensional modeling and texturing based off of camera tracking or solving systems;
three-dimensional modeling and texturing systems;
three-dimensional modeling and displacement systems; or
three-dimensional modeling and projection systems.

12. The method of claim 3, wherein one or more alternate perspective images include one or more revealed regions that were occluded in said single two-dimensional digital image.

13. The method of claim 3, wherein said two-dimensional to three dimensional conversion process includes determining one or more depths of said single two-dimensional digital image;

wherein said single two-dimensional digital image is recorded by an original monoscopic camera that includes a depth system selected from one or more of:
an additional camera that is mounted to said original monoscopic camera, which is oriented toward a same subject as said original monoscopic camera;
one or more beam splitter camera rigs; said additional camera being placed in proximity to said original monoscopic camera to capture one or more additional perspectives;
a lidar scanning system; a motion capture system;
a computerized motion control camera system; or
a multicamera timed camera system.

14. The method of claim 3, wherein said two-dimensional to three dimensional conversion process includes determining one or more depths of said single two-dimensional digital image;

wherein said one or more depths are determined through an analysis of one or more depth cues;
wherein said one or more depth cues are selected from one or more of: an atmospheric haze; an aerial dispersion; a volumetric light; a relative size of one or more objects in relation to a standard size of said one more objects; said relative size of said one or more objects in relation to said one or more objects proximity to a horizon; one or more foreground objects occluding one or more background objects; a relative speed of one or more moving objects over an equal distance; and a color, a shadow, or a lighting of said one or more objects.

15. The method of claim 1, further comprising:

estimating one or more occluded regions based on a pre-visualization of a two-dimensional to three-dimensional conversion of said single two-dimensional digital image.

16. The method of claim 15, wherein said one or more occluded regions of said one or more discrete elements is fully reconstructed.

17. The method of claim 16, further comprising:

pre-composing said one or more reconstructed discrete elements as encoded RGB, RGBA, or RGB and alpha image files prior to ingestion of said one or more reconstructed discrete elements into said two-dimensional to three-dimensional conversion process.

18. The method of claim 1, wherein said segmentation of one or more discrete elements is accomplished by a method selected from one or more of:

rotoscoping said single two-dimensional digital image manually through an operator; rotoscoping said single two-dimensional digital image partially manually and partially automatically; procedural color keying luminance keying; procedural color keying color difference keying; selective image isolation through motion vector analysis; selective image isolation through planar tracking; or selective image isolation through camera solving.

19. The method of claim 1, further comprising:

inserting a plurality of temporary image data into said one or more reconstructed occluded regions, wherein said plurality of temporary image data is in context of a scene within said original sequence of two-dimensional digital images;
wherein said plurality of temporary image data is selected from one or more of:
a solid color; a repeated pattern of image data; a repeated pattern of a plurality of colors; a replication of an image data formerly occluding said one or more occluded regions; an inverted version of said image data formerly occluding said one or more occluded regions; or blank data.

20. The method of claim 1, wherein said reconstructing of said one or more occluded regions of said one or more discrete elements is performed by one or more of:

a manual procedural painting;
a manual non-procedural painting;
a matte painting;
a computer generated replacement via three-dimensional model;
a computer generated replacement via two-dimensional model;
a computer generated replacement via particle system;
a computer generated replacement via procedural scripting;
a camera tracking, nodal tracking, planar tracking, motion vector tracking, and matchmoving;
a model;
a partially automated inpainting;
a partially automated image filtering system;
a fully automated inpainting;
a fully automated image filtering system; or
a grain removal, matching, and creation system.

21. A method of preparing a two-dimensional image sequence prior to subjecting the two-dimensional image through a two-dimensional to three-dimensional image conversion process, the method comprising:

receiving, by a computing device, an original sequence of two-dimensional digital images, wherein said original sequence of two-dimensional digital images includes a plurality of two-dimensional digital images;

segmenting, using the computing device, one or more discrete elements within said original sequence of two-dimensional digital images, wherein said one or more discrete elements have one or more occluded regions;

reconstructing said one or more occluded regions of said one or more discrete elements.

22. The method of claim 21, further comprising:

ingesting said one or more reconstructed discrete elements into a two-dimensional to three dimensional conversion process;

initiating said two-dimensional to three dimensional conversion process.

23. The method of claim 22, wherein said one or more reconstructed discrete elements include a plurality of revealed image data;

wherein said plurality of revealed image data is used during said two-dimensional to three dimensional conversion process to create one or more alternate perspective image sequences;

wherein said plurality of revealed image data allows said two-dimensional to three dimensional conversion process to be accomplished more efficiently.

24. The method of claim 23, further comprising:

re-compositing said one or more reconstructed discrete elements;

ingesting said one or more reconstructed and re-composted discrete elements into said two-dimensional to three dimensional conversion process.

25. The method of claim 24, further comprising:

wherein said one or more reconstructed discrete elements are re-composited in a monoscopic state that approximates said original sequence of two-dimensional digital images prior to segmentation.

26. The method of claim 25, further comprising:

estimating one or more occluded regions by pre-visualizing a two-dimensional to three dimensional conversion of said original sequence of two-dimensional digital images.

27. The method of claim 25, wherein said one or more occluded regions of said one or more discrete elements is fully reconstructed.

28. The method of claim 27, further comprising:

pre-composing said one or more reconstructed discrete elements as encoded RGB, RGBA, or RGB and Alpha image files before ingestion of said one or more reconstructed discrete elements into said two-dimensional to three dimensional conversion process.

29. The method of claim 24, wherein said re-compositing is accomplished using one or more of: Over; Add; Multiply; or Divide.

30. The method of claim 29, wherein said re-compositing is not made permanent until said two-dimensional to three-dimensional conversion process is completed.

31. The method of claim 23, further comprising:

estimating one or more occluded regions by pre-visualizing said two-dimensional to three dimensional conversion process of said original sequence of two-dimensional digital images and offsetting said one or more discrete elements accordingly;

wherein said one or more occluded regions of said one or more discrete elements is reconstructed based on pre-visualization estimation;

pre-composing said one or more discrete elements as encoded RGB, RGBA, or RGB and Alpha image files before ingestion of said one or more discrete elements into said two-dimensional to three dimensional conversion process.

32. The method of claim 23, further comprising:

wherein said one or more occluded regions of said one or more discrete elements is fully reconstructed;

pre-composing said one or more discrete elements as encoded RGB, RGBA, or RGB and Alpha image files before ingestion of said one or more discrete elements into said two-dimensional to three dimensional conversion process.

33. The method of claim 23, wherein said one or more alternate perspective image sequences created during said two-dimensional to three dimensional conversion process are a result of one or more of:

two-dimensional image modifications driven by three-dimensional geometry manipulation systems;

two-dimensional image modifications driven by two-dimensional depth map systems;

two-dimensional image modifications driven by color or luminance systems;

two-dimensional image modifications driven by two-dimensional warping and filtering systems;

two-dimensional image manipulations driven by motion vector estimation systems;

two-dimensional image manipulations driven by temporal estimation systems;

three-dimensional modeling and texturing based off of camera tracking or solving systems;

three-dimensional modeling and texturing systems;

three-dimensional modeling and displacement systems; or three-dimensional modeling and projection systems.

34. The method of claim 23, wherein said one or more alternate perspective image sequences include one or more revealed regions that were occluded in said original sequence of two-dimensional digital images.

35. The method of claim 23, wherein said two-dimensional to three dimensional conversion process includes determining one or more depths of said original sequence of two-dimensional digital images;

wherein said original sequence of two-dimensional digital images is recorded by an original monoscopic camera that includes a depth system selected from one or more of: an additional camera that is mounted to said original monoscopic camera, which is oriented toward a same subject as said original monoscopic camera; one or more beam splitter camera rigs; said additional camera being placed in proximity to said original monoscopic camera to capture one or more additional perspectives; a lidar scanning system; a motion capture system; a computerized motion control camera system; or a multicamera timed camera system.

36. The method of claim 23, wherein said two-dimensional to three dimensional conversion process includes determining one or more depths of said original sequence of two-dimensional digital images;

wherein said one or more depths are determined through an analysis of one or more depth cues;

wherein said one or more depth cues are selected from one or more of: an atmospheric haze; an aerial dispersion; a volumetric light; a relative size of one or more objects in relation to a standard size of said one more objects; said relative size of said one or more objects in relation to said one or more objects proximity to a horizon; one or more foreground objects occluding one or more background objects; a relative speed of one or more moving objects over an equal distance; and a color, a shadow, or a lighting of said one or more objects.

37. The method of claim 21, wherein said segmentation of one or more discrete elements is accomplished by a method selected from one or more of:
rotoscoping said single two-dimensional digital image manually through an operator; rotoscoping said single two-dimensional digital image partially manually and partially automatically; procedural color keying luminance keying; procedural color keying color difference keying; selective image isolation through motion vector analysis; selective image isolation through planar tracking; or selective image isolation through camera solving.

38. The method of claim 21, further comprising:
inserting a plurality of temporary image data into said one or more reconstructed occluded regions;
wherein said plurality of temporary image data is in context of a scene within said original sequence of two-dimensional digital images;
wherein said plurality of temporary image data is selected from one or more of:
a solid color; a repeated pattern of image data; a repeated pattern of a plurality of colors; a replication of an image data formerly occluding said one or more occluded regions; an inverted version of said image data formerly occluding said one or more occluded regions; or blank data.

39. The method of claim 21, wherein said reconstructing of said one or more occluded regions of said one or more discrete elements is performed using one or more of:
a manual procedural painting;
a manual non-procedural painting;
a matte painting;
a computer generated replacement via three-dimensional model;
a computer generated replacement via two-dimensional model;
a computer generated replacement via particle system;
a computer generated replacement via procedural scripting;
a camera tracking, nodal tracking, planar tracking, motion vector tracking, and matchmoving;
a model;
a partially automated inpainting;
a partially automated image filtering system;
a fully automated inpainting;
a fully automated image filtering system; or
a grain removal, matching, and creation system.

40. A system comprising:
a processor;
a memory device coupled to the processor and configured to store code corresponding to a series of operations for preparing a two-dimensional image prior to subjecting the two-dimensional image through a two-dimensional to three-dimensional image conversion process, the series of operations including receiving, by a computing device, a two-dimensional digital image;
identifying, using the computing device, one or more objects of the two-dimensional image;
for each of the identified objects, segmenting a discrete element within said single two-dimensional digital image, each discrete element including a corresponding object and one or more occluded regions; and
reconstructing said one or more occluded regions of each discrete element.

41. The system of claim 40, wherein the set of operations further comprise:
ingesting said one or more reconstructed discrete elements into a two-dimensional to three dimensional conversion process;
initiating said two-dimensional to three dimensional conversion process.

42. The system of claim 41, wherein said one or more reconstructed discrete elements include a plurality of revealed image data in the place of previously one or more occluded regions.

43. The system of claim 42, wherein the set of operations further comprises:
re-compositing said one or more reconstructed discrete elements;
ingesting said one or more reconstructed and re-composted discrete elements into said two-dimensional to three dimensional conversion process.

44. The system of claim 43, wherein the set of operations further comprises:
wherein said one or more reconstructed discrete elements are re-composited in a monoscopic state that approximates said single two-dimensional digital image prior to segmentation.

45. The system of claim 40, wherein the set of operations further comprises:
estimating one or more occluded regions based on a pre-visualization of a two-dimensional to three-dimensional conversion of said single two-dimensional digital image.

46. The system of claim 45, wherein said one or more occluded regions of said one or more discrete elements is fully reconstructed.

47. The system of claim 46, wherein the set of operations further comprises:
pre-composing said one or more reconstructed discrete elements as encoded RGB, RGBA, or RGB and alpha image files prior to ingestion of said one or more reconstructed discrete elements into said two-dimensional to three-dimensional conversion process.

48. The system of claim 40, wherein said segmentation of one or more discrete elements is accomplished by a method selected from one or more of:
rotoscoping said single two-dimensional digital image manually through an operator; rotoscoping said single two-dimensional digital image partially manually and partially automatically; procedural color keying luminance keying; procedural color keying color difference keying; selective image isolation through motion vector analysis; selective image isolation through planar tracking; or selective image isolation through camera solving.

49. The system of claim 40, wherein the set of operations further comprises:
inserting a plurality of temporary image data into said one or more reconstructed occluded regions, wherein said plurality of temporary image data is in context of a scene within said original sequence of two-dimensional digital images;
wherein said plurality of temporary image data is selected from one or more of:
a solid color; a repeated pattern of image data; a repeated pattern of a plurality of colors; a replication of an image data formerly occluding said one or more occluded regions; an inverted version of said image data formerly occluding said one or more occluded regions; or blank data.

50. The system of claim 40, wherein said reconstructing of said one or more occluded regions of said one or more discrete elements is performed by one or more of:
- a manual procedural painting;
- a manual non-procedural painting;
- a matte painting;
- a computer generated replacement via three-dimensional model;
- a computer generated replacement via two-dimensional model;
- a computer generated replacement via particle system;
- a computer generated replacement via procedural scripting;
- a camera tracking, nodal tracking, planar tracking, motion vector tracking, and matchmoving;
- a model;
- a partially automated inpainting;
- a partially automated image filtering system;
- a fully automated inpainting;
- a fully automated image filtering system; or
- a grain removal, matching, and creation system

* * * * *